US012793353B2

(12) United States Patent
Lawson

(10) Patent No.: US 12,793,353 B2

(45) **Date of Patent: *Nov. 10, 2026**

(54) SYSTEMS AND METHODS FOR MEASURING VIEWPOINT COMPENSATION FOR MOTION OF A HEAD MOUNTED DISPLAY

(71) Applicant: TRU Simulation + Training, Lutz, FL (US)

(72) Inventor: Matthew Edward Lawson, Wesley Chapel, FL (US)

(73) Assignee: TRU Simulation + Training, Lutz, FL (US)

( * ) Notice: Subject to any disclaimer, the term of this patent is extended or adjusted under 35 U.S.C. 154(b) by 72 days.

This patent is subject to a terminal disclaimer.

(21) Appl. No.: 18/890,552

(22) Filed: Sep. 19, 2024

(65) Prior Publication Data

US 2026/0080630 A1 Mar. 19, 2026

(51) Int. Cl.

*G06T 19/00* (2011.01)
*G02B 27/00* (2006.01)
*G02B 27/01* (2006.01)

(52) U.S. Cl.

CPC ........ *G06T 19/003* (2013.01); *G02B 27/0093* (2013.01); *G02B 27/017* (2013.01)

(58) Field of Classification Search

CPC .... G06T 19/20; H04N 13/324; H04N 13/373; H04N 13/376; H04N 13/378;

(Continued)

(56) References Cited

U.S. PATENT DOCUMENTS

| | | | | |
|---|---|---|---|---|
| 2020/0099911 | A1* | 3/2020 | Wang | G06T 15/205 |
| 2021/0035535 | A1* | 2/2021 | Kanda | G06T 19/00 |

(Continued)

FOREIGN PATENT DOCUMENTS

| | | | |
|---|---|---|---|
| CN | 114719638 | A | 7/2022 |
| CN | 117419638 | A | 1/2024 |
| WO | 2023163958 | A1 | 8/2023 |

OTHER PUBLICATIONS

Seo et al., "Photosensor-Based Latency Measurement System for Head-Mounted Displays," vol. 17, No. 5, May 15, 2017, 13 pages.

(Continued)

*Primary Examiner* — Ming Wu

(74) *Attorney, Agent, or Firm* — Slater Matsil, LLP

(57) ABSTRACT

Methods, apparatuses, and non-transitory storage media are provided. An example method includes displaying, in a virtual viewpoint of a virtual environment, the virtual environment including a first shape and a second shape. The second shape adjusts as the virtual viewpoint adjusts, in response to movement of a HMD secured to a test stand, and the first shape is affixed. The method includes receiving positioning information for a movement along a test axis applied to a test stand. The method includes receiving HMD spatial position data associated with the HMD. The method includes generating virtual adjustment information by combining the HMD spatial position data with the positioning information. The method includes recording reference data, and generating a positional displacement vector by comparing reference data of the first and second shapes. The method includes determining an error according to the positional displacement vector, and determining a test result according to the error.

20 Claims, 12 Drawing Sheets

(58) Field of Classification Search
CPC ....... H04N 13/398; G06F 3/012; G06F 3/011; G06F 3/0346; G06F 3/1423
See application file for complete search history.

(56) References Cited

U.S. PATENT DOCUMENTS

| | | | | |
|---|---|---|---|---|
| 2021/0258560 | A1* | 8/2021 | Adachi | G06F 3/011 |
| 2022/0091415 | A1* | 3/2022 | Misawa | A61B 5/163 |

OTHER PUBLICATIONS

Stauffert et al., "Simultaneous Run-Time Measurement of Motion-to-Photon Latency and Latency Jitter," 2020 IEEE Conference on Virtual Reality and 3D User Interfaces (VR), Mar. 1, 2020, 9 pages.

* cited by examiner

SYSTEMS AND METHODS FOR MEASURING VIEWPOINT COMPENSATION FOR MOTION OF A HEAD MOUNTED DISPLAY

TECHNICAL FIELD

The present disclosure relates generally to measuring viewpoint fidelity for a head mounted display, and in particular embodiments, to measuring and testing viewpoint compensation for motion of a flight simulation involving a head mounted display.

BACKGROUND

Flight simulator testing technology has evolved with the incorporation of head-mounted displays (HMDs), bringing new challenges and opportunities for creating immersive training environments. Such simulations involve a blend of sophisticated hardware and software solutions to ensure a realistic and effective simulation experience.

At the core of these systems are advanced motion facilitating and tracking technologies, including the use of such technologies to provide the realistic output for displaying to the HMD and otherwise. Such technologies typically combine optical systems using cameras and sensors with inertial measurement units, providing precise head position and orientation data. This tracking is crucial for rendering accurate visuals in the HMD as the user moves within an apparatus.

In various contexts, undesirable position changes may affect the HMD. For example, position changes or vibration caused by motion cueing or other components may impact a HMD and lead to false visual cues. Such false visual cues may introduce motion sickness when viewing the viewpoint associated with the HMD, or reduce the realism of the user's perspective when viewing the viewpoint associated with the HMD.

Determining errors introduced to a viewpoint associated with an apparatus, however, has remained challenging to ensure that simulated viewpoints remain accurate to an acceptable level. Embodiments of the present disclosure include methods, devices, and non-transitory computer-readable storage media that utilize particular elements to overcome these challenges to measure viewpoint fidelity in a head mounted display to determine or test at least one HMD-related error value, for example with respect to viewpoint compensation of a HMD, in one or more test directions.

SUMMARY OF THE DISCLOSURE

Technical advantages are generally achieved by embodiments of this disclosure which describe measuring viewpoint fidelity in a head mounted display.

In accordance with a first aspect of the disclosure, a method is provided. An example method includes displaying, in a virtual viewpoint of a virtual environment, the virtual environment including at least a first shape and a second shape in a virtual viewpoint. The second shape adjusts in the virtual viewpoint as the virtual viewpoint adjusts. The first shape is affixed in the virtual viewpoint of the virtual environment. The virtual viewpoint of the virtual environment is configured to adjust in response to movement of a head mounted display (HMD) secured to a test stand. The example method further includes receiving, from a motion cueing system, positioning information corresponding to a movement to an excursion value along a test axis applied to a test stand. The example method further includes receiving, from the HMD, HMD spatial position data associated with the HMD secured to the test stand. The example method further includes generating virtual adjustment information by at least combining the HMD spatial position data with the positioning information. The virtual viewpoint and the second shape are adjusted according to the virtual adjustment information. The example method further includes recording reference data associated with the movement applied to the test stand. The example method further includes generating a positional displacement vector by at least comparing the reference data of the second shape with reference data of the first shape. The example method further includes determining a HMD movement tracking error according to the positional displacement vector. The example method further includes determining a test result according to the HMD movement tracking error In some embodiments, the example method further includes outputting the test result. In some embodiments, determining the test result according to the HMD movement tracking error includes determining that the HMD movement tracking error is within a threshold, where the test result is a test passed result. In some embodiments, the threshold is about 2 inches. In some embodiments, the example method further includes detecting a test completion trigger, where determining the test result is in response to the detecting of the test completion trigger. In some embodiments, the example method further includes generating at least one orientation displacement angle by at least comparing the reference data of the first second with reference data of the first shape. The example method further includes determining a HMD orientation tracking error according to the at least one orientation displacement angle. In some embodiments, the example method further includes determining a test result according to the HMD orientation tracking error. The example method further includes outputting the test result. In some embodiments, the example method further includes determining that the HMD orientation tracking error is within a threshold, where the test result is a test passed result. In some embodiments, the threshold is about 5 degrees. In some embodiments, the example method further includes generating the virtual environment including a third shape that blocks at least a portion of the virtual environment from rendering in the virtual viewpoint. In some embodiments, the example method further includes causing outputting of the virtual environment to an additional display or a second additional display. In some embodiments, the first shape includes a first circular shape with a first at least one cutout, and the second shape includes a second circular shape with a second at least one cutout.

In some embodiments, the example method further includes for each additional test axis of at least one additional test axis: receiving, from the motion cueing system, additional positioning information corresponding to an additional movement to an additional excursion value along the additional test axis applied to a test stand, receiving, from the HMD, additional HMD spatial position data associated with the HMD secured to the test stand, generating additional virtual adjustment information by at least combining the HMD spatial position data with the positioning information, where the virtual viewpoint and the second shape are adjusted based on the virtual adjustment information, recording additional reference data associated with the additional movement applied to the test stand, generating additional positional displacement vector by at least comparing the additional reference data of the second shape with additional reference data of the first shape, determining an additional HMD movement tracking error based on the positional displacement vector, and determining an additional test result according to the additional HMD movement tracking error, where the additional test result is associated with the additional test axis.

In some embodiments, the test stand is locked for movement along the test axis.

In some embodiments, the first shape is of a first color and the second shape is of a second color, where the first color and the second color are visually distinguishable.

In accordance with a second aspect of the disclosure, an apparatus is provided. An example apparatus includes at least one processor. The example apparatus includes at least one memory having computer program instructions stored thereon. The computer program instructions, in execution with the at least one processor, causes the apparatus to perform the example method in accordance with any one of the example methods described herein.

In accordance with a third aspect of the disclosure, at least one non-transitory computer-readable storage medium is provided. An example at least one non-transitory computer-readable storage medium includes computer program instructions stored thereon that, in execution with at least one processor, is configured for performing the example method in accordance with any one of the example methods described herein.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
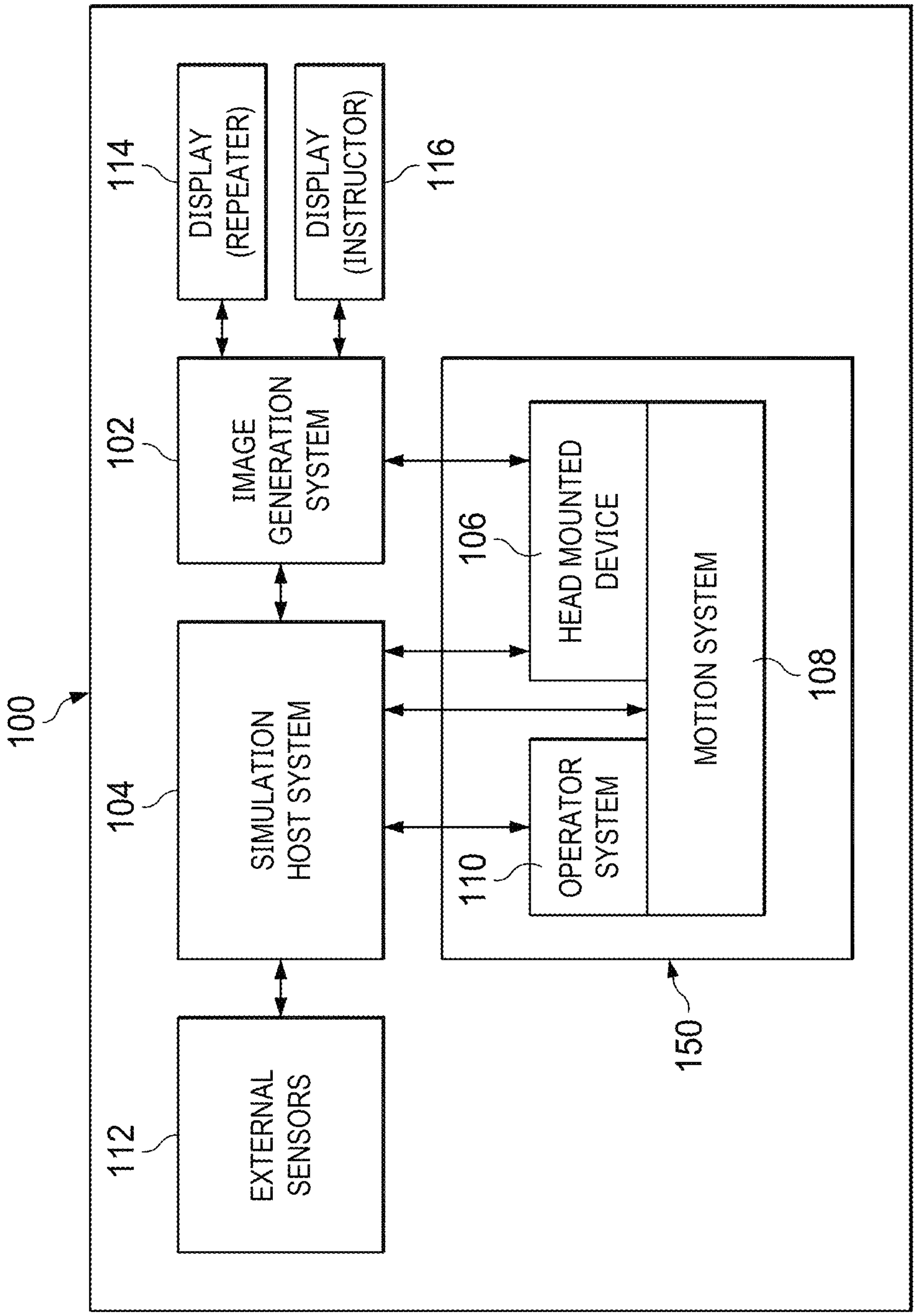
FIG. 1 is a block diagram illustrating an HMD flight simulator system in accordance with at least embodiment of the disclosure.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions, or alterations can be made herein without departing from the spirit and scope of this disclosure as defined by the appended claims.

Simulating a virtual environment involves generating and depicting virtualized versions of real-world objects, items, and environments that are output to a display for depicting to a user. A head mounted display (HMD) may be utilized by a user to provide realistic input/output to a display, or otherwise immerse a user in the simulation to provide a more realistic simulation experience. For example, the HMD may be worn by the user such that as the user performs a movement (e.g., rotates or otherwise repositions their head), a viewpoint of a virtual environment that is displayed is updated based on the movement performed.

In various contexts, including simulation of vehicle movements such as aerial vehicles, additional specialized hardware or software components may be utilized for any of a myriad of purposes. Particular hardware or software components in some contexts are provided that match real-world controls of the particular context. For example, in one such context where a simulation is provided for controlling a particular aerial vehicle (e.g., a flight simulator for training a pilot on a particular aerial vehicle), specialized hardware that matches the exact controls of the particular aerial vehicle may be provided as part of the simulation apparatus. The simulation apparatus may also include a motion cueing system that manipulates the user within the simulation apparatus. For example, a motion cueing system may affect the simulation apparatus to simulate movement effects based on the inputs provided by the user through any of a myriad of controls, such as movements in any one or more of 6 degrees of freedom or combination thereof. In certain contexts, such as using a simulation apparatus to simulate piloting a particular aerial vehicle during training of a pilot for that aerial vehicle, maintaining a realistic virtual environment and viewpoint is particularly desirable to ensure that the training performed will accurately map to the pilot's real-world experience in controlling the particular aerial vehicle.

Components of the simulation apparatus, particularly the motion cueing system for example, or related components that affect movement such as a vibration system, may impact operation of the HMD in an undesirable manner. For example, as the motion cueing system or other components operate, such components may, due to such movements, introduce false visual cues into a displayed viewpoint of the HMD. Non-limiting examples of such false visual cues include impacts to the displayed viewpoint of the HMD based on minor vibrations to the HMD or other positional or rotational offsets. These false visual cues include undesirable HMD position changes that do not accurately reflect the realistic viewpoint of the user, or can impact the health of the user by inducing motion sickness upon wearing the HMD.

Determining, and compensating for, such false visual cues is desirable to reduce or eliminate these negative effects. In this regard, a test procedure may be desirable for use in determining what, if any, errors are present in operation of an HMD on a testing apparatus. Such a test procedure includes use of the simulation apparatus and related viewpoint outputted in accordance with the simulation to perform one or more defined procedures that indicate whether the viewpoint compensation for movement effects to a HMD is properly accounted for, or whether such movement effects are negatively impacting the operation of the HMD to a level that is not acceptable for realistic simulation use.

Embodiments of the disclosure include particular methods, apparatuses, and non-transitory computer readable storage media for measuring viewpoint compensation for movement of a head mounted display. In this regard, such procedures in some embodiments provide a virtualized simulation environment that includes specially configured elements utilized to perform such measuring. The specially configured elements may be updated as described herein as one or more inputs are received, where the specially configured elements enable such measuring.

Some embodiments, for example, generate a virtual environment that includes at least a first shape and a second shape in a virtual viewpoint. The first shape is in front of the second shape within the virtual viewpoint. The second shape is configured to adjust as the virtual viewpoint adjusts. In this regard, the second shape may move its position within the virtual viewpoint as an input adjusting the virtual viewpoint is received, for example based on movements of an associated HMD that defines the virtual viewpoint in the virtual environment. The first shape is affixed in the virtual viewpoint of the virtual environment, such that the first shape is specially configured to remain in a set position as the virtual viewpoint is adjusted (e.g., via movement of a HMD).

The virtual viewpoint of the virtual environment is configured to shift in response to movement of the HMD. In some embodiments the HMD is mounted to or otherwise secured to a test stand. The test stand may be configured to move in any desired manner, for example in any one of 6 possible degrees of freedom. The test stand may be locked to prevent movement in any test axis. In this regard, movement applied to the test stand (e.g., by a motion cueing system) may cause a movement in the entirety of the test stand accordingly. By being secured to the test stand, the HMD may have its position or orientation adjusted together with the test stand, thus providing updated input data for updating a virtual viewpoint of the virtual environment or one or more elements of the virtual environment or one or more elements of the virtual environment associated with the virtual environment, for example the first shape affixed to the virtual viewpoint. For example, in some embodiments, a motion cueing system applies a movement along a particular test axis to an excursion value to the test stand, and the virtual viewpoint is updated within the virtual environment together with the first shape that is affixed to the virtual viewpoint. In this regard, the first shape may remain in the same place of the virtual viewpoint, for example such that the first shape is centered within the virtual viewpoint regardless of the movement of the virtual viewpoint within the virtual environment.

Some embodiments further receive positioning information corresponding to a movement to an excursion value along a test axis applied to the test stand, and a movement from the excursion value to a neutral value along the test axis. The positioning information may be received from a motion cueing system, for example where the motion cueing system initiates or otherwise applies the movement applied to the test stand. The neutral value may represent a default value along a test axis where the test stand is oriented (e.g., a "forward facing" position). The excursion value may represent a value along the test axis to which the motion cueing system associated with applying a movement to the test stand is moved (e.g., rotated, traversed, re-oriented, or the like). The first movement may be a movement from the neutral value to the excursion value as the test stand is manipulated to a test point, and the second movement may be a movement back from the excursion value to the neutral value. During testing of a particular test axis, the test stand may be in a locked configuration.

In some embodiments, a motion cueing system triggers movement applied to the test stand to a particular excursion value. In some embodiments, positioning information is received from the motion cueing system that represents the initiated movement. Some embodiments generate the positioning information, for example to trigger the motion cueing system to initiate the movement.

Some embodiments receive HMD spatial position data associated with the HMD secured to the test stand. The HMD spatial position data may be captured and/or received from one or more sensors of the HMD itself. Additionally or alternatively, in some embodiments, HMD spatial position data is captured and/or received from one or more external sensors associated with monitoring the HMD, or any combination of external sensors and HMD sensors. The HMD spatial position data represents changes in the orientation or positioning of the HMD secured to the test stand as motion is applied to a test stand. In this regard, the HMD spatial position data may represent sensor readings or other determinations of orientation or position data for the HMD during or in response to such motion.

Some embodiments generate virtual adjustment information by at least combining the HMD spatial position data with the positioning information. The combination of the HMD spatial position data and the positioning information represents an influence on the HMD of the movement applied to the test stand.

Some embodiments record reference data of the first shape indicating at least a reference position of the first shape.

Some embodiments generate a positional displacement vector. The positional displacement vector is generated by at least comparing the reference data of the first shape with reference data of the second shape.

Some embodiments determine a HMD movement tracking error based on the positional displacement vector. In some embodiments, the HMD movement tracking error is represented based on a magnitude or other value of the positional displacement vector. In this regard, the HMD movement tracking error may represent an amount of positional displacement between the first shape and the second shape, indicating a tracking offset affecting the accuracy of handling movements along the test axis.

The HMD movement tracking error may be utilized in any of a myriad of manners. Some embodiments utilize the HMD movement tracking error to determine test result indicating whether the test should be deemed a success (e.g., the error determined is sufficient to enable realistic simulating), or failure (e.g., the error determined is not sufficient to enable realistic simulating). For example, the HMD movement tracking error may be compared with a threshold to determine whether or not the HMD movement tracking error is within the desired threshold. The test result may be output for further use, rendering, or the like, for example as output to a display of the HMD itself, or at least one additional display observed by another user. In this regard, embodiments may be utilized to identify viewpoint compensation errors associated with a HMD, and advantageously improve capabilities to determine whether such viewpoint compensation errors are within acceptable thresholds for accurately simulating particular operations.

Example Embodiments of the Disclosure

Example embodiments based on measuring viewpoint compensation in a simulation involving a HMD are described, for example for as part of measuring or testing the realism validity of a flight simulation system. Additionally or alternatively, example embodiments, based on measuring particular data indicating errors associated with viewpoint compensation, testing may be performed that indicates whether such data indicates that a test of viewpoint compensation was passed or failed.

Example System Implementations and Devices

FIG. 1 illustrates a block diagram for an example system in accordance with at least one aspect of the disclosure. Specifically, FIG. 1 illustrates an example system 100. The example system 100 includes a simulation apparatus 150, at least one display (e.g., display 114 and display 116), a simulation host system 104, and an image generation system 102. In some embodiments, the system 100 optionally includes one or more external sensors 112. In some embodiments, the system 100 is configured to provide viewpoint compensation measuring or testing. For example, in some embodiments, the simulation host system 104 or the image generation system 102, or a device combining the two, is configured to perform the viewpoint compensation measuring or testing described herein based on data processed, collected, or otherwise received from other devices of the system 100 operating in conjunction with one another.

The simulation apparatus 150 includes any number of components, including any number of devices, sub-systems, or other hardware or software, that enables simulation of a particular environment, for example an environment for operating a particular vehicle. In some embodiments, the simulation apparatus 150 includes an operator system 110, a head mounted device 106, and a motion system 108 (also referred to as a "motion cueing system"). The head mounted device 106 in some embodiments is mounted on or otherwise secured to a test stand, such that a manipulation to the test stand manipulates a position or orientation of the head mounted device 106. In some embodiments, the head mounted device 106 is mounted to or otherwise secured to a user in the simulation apparatus 150, for example that is operating certain controls thereof as part of simulating operation of a vehicle via the simulation environment.

The head mounted device 106 includes a display and one or more input or output elements. For example, in some embodiments, the head mounted device 106 includes a virtual reality headset. The head mounted device 106 may include one or more displays that depict a virtual viewpoint, or multiple virtual viewpoints, of a virtual environment. The head mounted device 106 additionally may include one or more sensors that determine or record a headset orientation, position, movement, or the like. In some embodiments, the head mounted device 106 is worn by a user, for example an operator associated with the simulation apparatus 150. Additionally or alternatively, in some embodiments, the head mounted device 106 is secured to a test stand that functions to replace a user head in the simulation apparatus 150. The test stand may be configured to enable movement along a particular test axis, for example such that the head mounted device 106 is similarly moved in accordance with the movement along the test axis. In some embodiments, the head mounted device 106 is configured to provide data representing movements of the HMD or changes in movement detected by the HMD, for example as HMD spatial position data. In some embodiments, the head mounted device 106 includes the Varjo™ XR-4 series headset.

The operator system 110 is configured to provide input in accordance with a particular environment to be simulated. For example, in some embodiments, the operator system 110 includes control inputs that mirror those of a particular vehicle for which simulated operation is to be performed. In one example context, the operator system 110 includes cockpit controls of an aerial vehicle for which simulated operation is to be performed. Such inputs may correspond to data values that represent updates to such controls, including any number of analog or digital inputs, as a user interacts with such controls. In some embodiments, the simulation host system 104 receives control data associated with updating elements of the simulation from the operator system 110 exclusively.

The motion system 108 simulates movement, vibrations, or other motion associated with an environment. In one example context, the motion system 108 simulates movement effects associated with operation of an aerial vehicle, for example based on inputs or determined simulation states associated with such a system of the aerial vehicle operating. In some embodiments, the motion system 108 comprises a base system upon which one or more other components of the simulation apparatus 150 are mounted for simulating such movement effects. For example, in some embodiments, the operator system 110 or the head mounted device 106 are mounted on, secured to, or otherwise positioned on the motion system 108. In this regard, motion effects initiated by the motion system 108 affect the position or orientation of such other components. In some embodiments, the motion system 108 includes a CKAS W10 6-degree of freedom (DOF) motion system. In some embodiments, the simulation host system 104 receives status information associated with operation of the motion system 108, controls movement of the operation of the motion system 108 and optionally receives feedback status information.

The system 100 further includes a simulation host system 104. The simulation host system includes hardware, software, firmware, or any combination thereof, that generates, maintains, or configures a simulation environment. For example, in some embodiments, the simulation host system 104 includes a specially configured server, where the server includes at least specially configured hardware (e.g., executing particular firmware, software, or both) that maintains the simulation environment. For example, the simulation host system 104 may include at least one processor (e.g., a CPU, multiple CPUs, or the like), and at least one non-transitory computer-readable storage medium (e.g., a memory), and is configured to execute the simulation environment upon execution of computer program instructions stored on the at least one non-transitory computer-readable storage medium by the at least one processor.

In some embodiments, the simulation host system 104 maintains one or more simulation environments based on generated or received data associated with at least one element of the simulation environment. For example, in some embodiments, the simulation host system 104 receives input data from the operator system 110, motion system 108, or head mounted device 106. The operator system 110 may provide input associated with user (e.g., an operator) interactions with controls of the operator system 110, the head mounted device 106 may provide orientation or position data based on movement of the head mounted device 106, or the motion system 108 may provide movement data indicating changes to orientation, position, vibrations, or other movements, for example where such movements affect the other components of the simulation apparatus 150. Such data may be provided directly to the simulation host system 104, or in other embodiments is provided via one or more intermediary devices. In some embodiments, the simulation host system 104 interacts with an Unreal Engine™ instance, for example to update visual depictions of the virtual environment.

Additionally or alternatively, in some embodiments, the simulation host system 104 commands or otherwise makes demands of the image generation system 102 to maintain the virtual environment. For example, in some embodiments, such commands cause updating of one or more virtual models within the virtual environment. Such commands may be based at least in part on simulation results or control input from the user received via the simulation host system 104. For example, in some embodiments the simulation host system 104 sends one or more commands to the image generation system 102 to move a virtual model corresponding to a particular vehicle two feet vertically within its virtual environment, and the image generation system 102 includes hardware, software, firmware, or a combination thereof that performs the commanded movement.

In some embodiments, the system 100 includes one or more external sensors 112. The external sensors may detect or measure one or more aspects associated with the simulation apparatus 150, or a portion thereof, for use in configuring the virtual environment or a virtual viewpoint of the virtual environment. In some embodiments, the external sensors 112 include movement sensors, cameras, or the like. In some embodiments, the external sensors 112 are used to detect particular elements in or associated with the simulation apparatus 150, for example positions of a hand of an operator interacting with the simulation apparatus 150. Additionally or alternatively, in some embodiments, the external sensors 112 measure data values associated with the environment of or around the simulation apparatus 150. The external sensors 112 may provide measured data to the image generation system 102, for example for use in configuring one or more virtual elements in a virtual environment. The image generation system 102 may utilize such data to accurately depict positions, orientations, or other states of such virtual elements within the virtual environment. For example, the image generation system 102 may receive data corresponding to positions of particular real-world elements of the real-world simulation environment utilize such data to accurately position virtual elements in the virtual environment that corresponding to such real-world simulation elements.

In some embodiments, the system 100 includes an image generation system 102. The image generation system 102 includes hardware, software, firmware, or any combination thereof, that generates or provides output data for rendering to one or more displays. The output data includes renderings of a virtual viewpoint within a virtual environment, for example as simulated by the simulation host system 104. In some embodiments, the image generation system 102 and the simulation host system 104 share one or more hardware or software components, for example where the simulation host system 104 and the image generation system 102 are executed on the same server, or where the simulation host system 104 and the image generation system 102 are embodied by submodules of a particular simulation software package. In one example embodiment, the image generation system 102 comprises a single image generation channel, for example of an instance of Unreal Engine's™ TRU simulation environment.

The image generation system 102 is configured to render particular shapes and other virtual elements of the virtual environment generated, maintained, or otherwise configured by the simulation host system 104. In some embodiments, the image generation system 102, the simulation host system 104, or another system communicably coupled to one of such systems, provides output data utilized to cause rendering based on such data to one or more displays a display of the head mounted device 106. Additionally or alternatively, in some embodiments, the image generation system 102 provides output data for rendering to the display 114 (e.g., a repeater display), display 116 (e.g., an instructor display), or both. In some embodiments, the image generation system 102 does not directly output to the additional display 114 or display 116, and such displaying may be facilitated indirectly via one or more other systems in communication with the image generation system 102. In this regard, the image generation system 102 may continuously cause outputting or cause rendering of frames depicting a virtual viewpoint of the virtual environment as updated inputs affecting the virtual environment are received, for example changes in orientation or position of the head mounted device 106, control input changes via the operator system 110, or motion cueing data or related positioning information may be monitored associated with motion performed, or is received from the motion system 108 of the simulation apparatus 150.

In some embodiments, one of the image generation system 102 or the simulation host system 104 is specially configured to perform the one or more tests described herein. Additionally or alternatively, in some embodiments, the system 100 includes particular elements, subsystems, or the like configured via hardware, software, firmware, or any combination thereof, to perform a particular test or set of tests. For example, in some embodiments, the system 100 additionally or alternatively includes one or more specific measurement equipment, computer vision systems or components, or the like that enables process operations for detecting a position offset, angle offset, or both, between shapes or other virtual elements in a virtual environment as described herein. It will be appreciated that different systems may include different components or specialized configurations of such components that perform such testing or particular operations thereof. For example, in some embodiments, the system 100 includes an imaging photometer, an image generation system 102 or simulation host system 104 configured to perform computer vision, or the like to visually determine a position offset, angle offset, or both between two or more shapes within a virtual viewpoint as described herein.

In some embodiments, the image generation system 102 includes a specially configured server, where the server includes at least specially configured hardware (e.g., executing particular firmware, software, or both) that configures renderings of a virtual viewpoint for a virtual environment, for example maintained by the simulation host system 104. The image generation system 102 may include at least one processor (e.g., a CPU, multiple CPUs, or the like), and at least one non-transitory computer-readable storage medium (e.g., a memory), and is configured to cause the renderings upon execution of computer program instructions stored on the at least one non-transitory computer-readable storage medium by the at least one processor.

In some embodiments, the system 100 includes any number of displays, each configured to render data viewable by one or more viewers. As illustrated, the head mounted device 106 includes at least one display that provides renderings of a virtual environment. For example, in some embodiments the head mounted device 106 embodies a headset including one or more display that are configured to provide viewing of a three-dimensional virtual environment while wearing the head mounted device 106. Additionally or alternatively, as illustrated, the system 100 includes a display 114 that functions as a repeater display. In this regard, the display 114 may render the same data as outputted to the head mounted device 106, such that the corresponding renderings may be viewed external from the head mounted device 106 by one or more users. Additionally or alternatively, as illustrated, the system 100 further includes a display 116 that functions as an instructor display. The instructor display in some embodiments includes a second repeat display that renders the same data as outputted to the head mounted device 106. In some embodiments the display 116 includes one or more additional or alternative renderings that are specific to that display, for example additional UI elements, controls, or the like that are specific to operations performed by another user associated with the simulation (e.g., instructor-specific operations). In this regard, the image generation system 102 may provide data representing a virtual viewpoint of a simulation environment for rendering to any one or more of such displays associated therewith.

Figure 2:
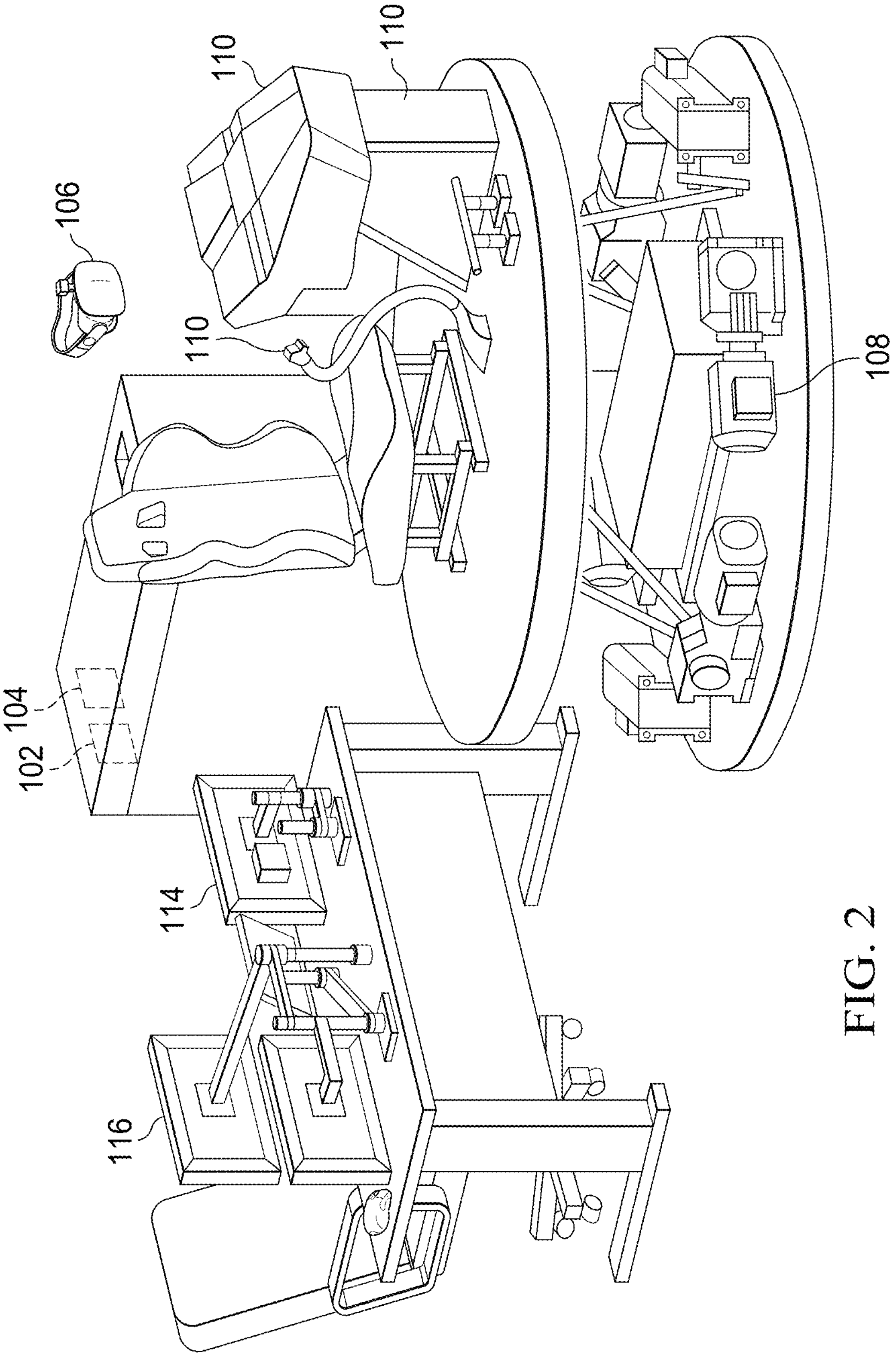
FIG. 2 is a diagram depicting devices in accordance with at least one aspect of the disclosure.

FIG. 2 illustrates a depiction of devices positioned in accordance with at least one aspect of the disclosure. As depicted, the operator system 110 includes any number of subcomponents, for example in some embodiments the operator system 110 includes one or more cockpit controls, one or more primary controls, or one or more input/output (I/O) components. The operator system 110 includes a seat or other control where an operator may be located (e.g., seated) during operation of the operator system or the simulation apparatus 150 associated therewith.

Further as depicted, the operator system 110 and the head mounted device 106 may be positioned such that they are secured to, or otherwise positioned on top of, the motion system 108. In this regard, each movement or motion performed via the motion system 108 may impact such other devices positioned on the motion system 108. The display 116, display 114, image generation system 102, and simulation host system 104 are positioned separately from the motion system 108, such that movements of the motion system 108 do not impact such other devices. The various components may be communicatively coupled via wired or wireless means to perform the data transmissions described herein.

Figure 3A:
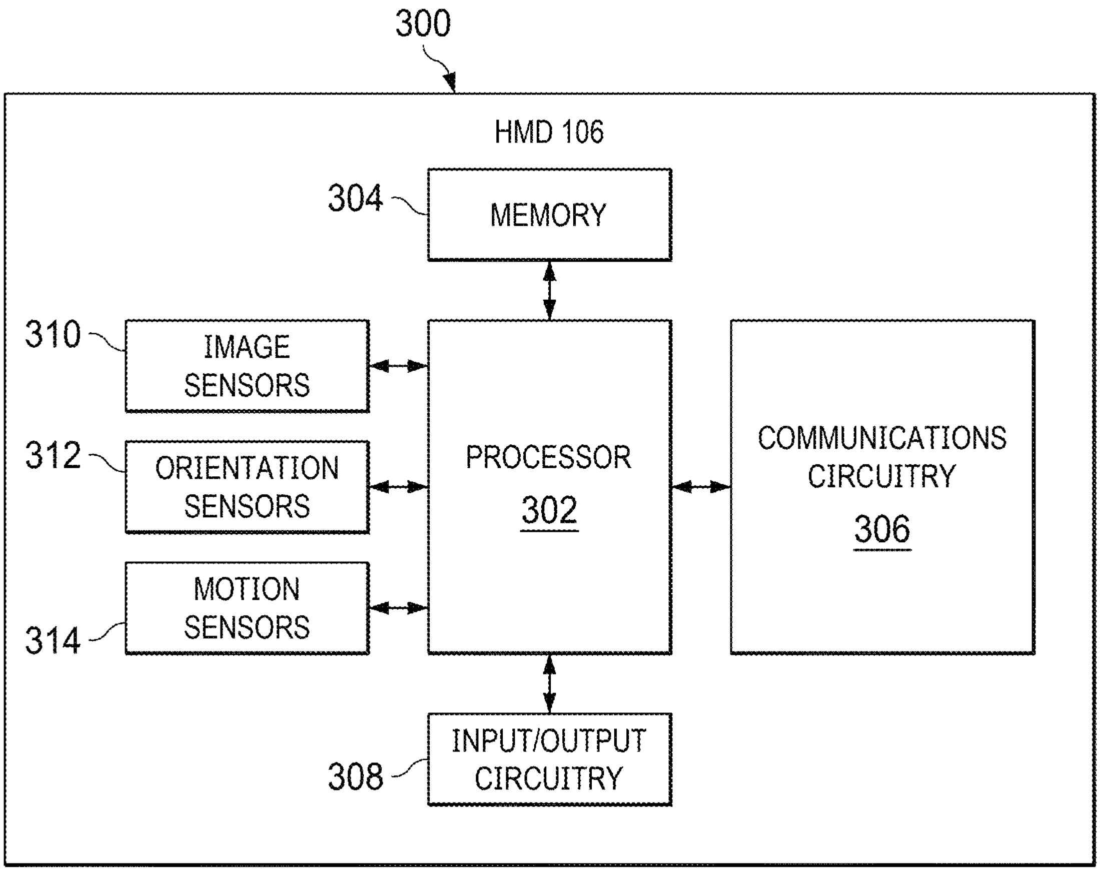
FIG. 3A is a block diagram illustrating an example HMD in accordance with at least one aspect of the disclosure.

FIG. 3A illustrates a block diagram of an example HMD in accordance with at least one aspect of the disclosure. Specifically, FIG. 3A depicts an example apparatus 300 embodying an example of the head mounted device 106. The apparatus 300 includes a processor 302, a memory 304, a communications circuitry 306, an input/output circuitry 308, one or more image sensors 310, one or more orientation sensors 312, or one or more motion sensors 314. The apparatus 300 may be configured, using or one or more portions of the circuitry depicted, to execute the operations described herein.

Although the components are described with respect to functional limitations, it should be understood that the particular implementations necessarily include the use of particular hardware. It should also be understood that certain components described herein may include similar or common hardware. For example, two sets of circuitry or modules may both leverage use of the same processor, network interface, storage medium, or the like to perform their associated functions, such that duplicate hardware is not required for each set of circuitry. The use of the term "module" or the term "circuitry" as used herein with respect to components of the apparatus 300 should therefore be understood to include particular hardware configured to perform the functions associated with the particular sets of circuitry as described herein.

Additionally or alternatively, the terms "circuitry" and "module" should be understood broadly to include hardware and, in some embodiments, software or firmware for configuring the hardware. For example, in some embodiments "circuitry" and "module" may include processing circuitry, non-transitory storage media, network interfaces, input/output devices, or the like. In some embodiments, other elements of the apparatus 300 may provide or supplement the functionality of the particular set of circuitry. The processor 302 may provide processing functionality, the memory 304 may provide processing functionality, the memory 304 may provide storage functionality, the communications circuitry 306 may provide network interface functionality, and the like.

An apparatus 300 may include one or more processors 302 and one or more computer readable medium (such as memory 304) storing computer code thereon. References to computer-readable storage medium, computer program product, tangibly embodied computer program, or the like, or a controller, monitor, specially configured HMD system, computer, processor, or the like should be understood to encompass not only computers having different architectures such as single or multi-processor architectures and sequential (Von Neumann) or parallel architectures but also specialized circuits such as field-programmable gate arrays (FPGAs), application specific circuits (ASICs), signal processing devices and other devices. References to computer program, instructions, code, or the like, should be understood to encompass software for a programmable processor or firmware such as, for example, the programmable content of a hardware device whether instructions for a processor, or configuration settings for a fixed-function device, gate array or programmable logic device, or the like.

The apparatus 300 may have at least one processor 302 and at least one memory 304, such as a non-transitory computer readable medium, and may include computer program code, that is configured to, with the at least one processor, perform the method described herein. The memory 304 may be a single component or it may be implemented as one or more separate components some or all of which may be integrated or removable and may provide permanent, semi-permanent, dynamic, or cached storage.

The one or more processors 302 are configured to read from and write to the at least one memory 304. The processor may also comprise a bus or an output interface via which data or commands are output by the processor 302 and an input interface via which data or commands are input to the processor 302. The memory 304 stores a computer program including computer program instructions that control the operation of apparatus 300, when loaded into the processor. The computer program instructions provide the logic and routines that enable the apparatus to perform the HMD methods and implement specially configured HMD systems. The processor 302, by reading the memory 304, is able to load and execute the computer program. The computer program or programs may arrive at the apparatus via any suitable delivery mechanism. The delivery mechanism may be, for example, a computer-readable storage medium, a computer program product, a memory device, a record medium such as a compact disc read on only memory (CD-ROM), digital versatile disc (DVD), portable memory such as a memory stick or hard drive, or the like, an article of manufacture that tangibly embodies the computer program. In some embodiments, the delivery mechanism may be a signal configured to reliably transfer the computer program over the air or via an electrical connection.

In some embodiments, the processor 302 (or processor or any other processing circuitry assisting or otherwise associated with the processor) may be in communication with the memory 304 via a bus for passing information among components of the apparatus 300. The memory 304 may be non-transitory and may include, for example, one or more volatile or non-volatile memories. In other words, for example, the memory may be an electronic storage device (e.g., a computer readable storage medium). The memory 304 may be configured to store information, data, content, applications, instructions, or the like, for enabling the apparatus 300 to carry out various functions in accordance with example embodiments of the present disclosure.

The processor 302 may be embodied in any one or more of a myriad of ways and may, for example, include one or more processing devices configured to perform independently. Additionally or alternatively, the processor 302 may include one or more processors configured in tandem via a bus to enable independent execution of instructions, pipelining, or multithreading. The use of the terms "processor," "processing module," and "processing circuitry" may be understood to include a single-core processor, a multi-core processor, multiple processors internal to the apparatus, at least one field-programmable gate array (FPGA), at least one graphic processing unit (GPU), at least one application specific integrated circuit (ASIC), or at least one remote or cloud processors.

In an example embodiment, the processor 302 may be configured to execute computer-coded instructions stored in the memory 304 or otherwise accessible to the processor. Alternatively, or additionally, the processor 302 may be configured to execute hard-coded functionality. As such, whether configured by hardware or software methods, or by a combination thereof, the processor 302 may represent an entity (e.g., physically embodied in circuitry) capable of performing operations according to an embodiment of the present disclosure while configured accordingly. Alternatively, as another example, when the processor is embodied as an executor of software instructions, the instructions may specially configure the processor to perform the algorithms or operations described herein when the instructions are executed.

In one example context, the processor 302 may be configured to provide data associated with the orientation, position, movement, or elements associated with interacting with the HMD. Additionally or alternatively, in some embodiments, the processor 302 may be configured to output a virtual environment, for example by displaying an image representation of a virtual viewpoint of a portion of the virtual environment at a particular time. The virtual environment may be continuously updated by one or more systems, for example an image generation system 102, as interactions occur via a simulation apparatus. The processor 302 outputs the virtual environment including at least a first shape and a second shape in a virtual viewpoint of the virtual environment. The processor 302 depicts the first shape in front of the second shape in the virtual viewpoint and depicts adjustments to the second shape as the virtual viewpoint adjusts. The first shape is affixed in the virtual viewpoint of the virtual environment, and in this regard may be movable within the virtual environment together with the virtual viewpoint. The virtual viewpoint of the virtual environment is configured to adjust in response to movement of a head mounted display secured to a test stand. The processor 302 may be configured to cause outputting of the virtual viewpoint of the virtual environment as it is adjusted in response to positioning information corresponding to received data indicating a movement by the HMD, for example HMD spatial position data associated with a movement performed by a motion cueing system, and applied to the test stand, to an excursion value along a test axis or a movement, performed by the motion cueing system, from the excursion value to a neutral value along the test axis. The processor 302 is further configured to provide HMD spatial position data associated with the apparatus 300 secured to the test stand, for example as it moves along the test axis. In some embodiments, the processor 302 is configured to continuously update a displayed rendering of the virtual environment, for example to a display screen of the apparatus 300, as updated data associated with the virtual environment is received in response to data that is provided by the processor 302 of the HMD.

In some embodiments, the apparatus 300 may include input/output circuitry 308 that may, in turn, be in communication with processor 302 to provide output to the user and in some embodiments, to receive an indication of one or more user inputs. The input/output circuitry 308 may comprise a user interface and may include a display (e.g., for rendering one or more user interfaces, such as to the display). The user interfaces comprise a web user interface, customized device application, native device interface, a mobile or desktop application, or in some embodiments includes a client device linked or otherwise networked to an associated system configuring the virtual environment. In some embodiments, the input/output circuitry 308 may also include gesture controls, soft keys, buttons, a microphone, a speaker, touch areas, or other input/output mechanisms. The processor, such as the processor 302, or the user interface circuitry comprising the processor, for example processor 302, may be configured to control one or more functions of one or more user interface elements through computer program instructions (e.g., software or firmware) stored on a memory accessible to the processor 302 (e.g., via memory 304, or the like).

The communications circuitry 306 may be any means, including for example and without limitation a device or circuitry embodied in hardware, software, firmware, or any combination thereof, which is configured to receive or transmit data from or to a network or any other device, circuitry, or module in communication with the apparatus 300. In this regard, the communications circuitry 306 may include, for example, a network interface for enabling communications with a wired or wireless communications network. For example, the communications circuitry 306 may include one or more network interface cards, antennas, buses, switches, routers, modems, and supporting hardware or software, or any other device suitable for enabling communications via a network. Additionally or alternatively, in some embodiments the communication interface may include the circuitry for interacting with the antennas to cause transmission of signals via the antennas or to adjust receipt of signals received via the antennas.

The apparatus 300 in some embodiments further includes one or more image sensors 310. In some embodiments, the image sensors 310 include one or more cameras that capture images, videos, or the like surrounding the head mounted device. For example, in some embodiments, the image sensors 310 includes cameras that face outward from the apparatus 300, for example to the sides, above, below, or forward from an axis relatively normal to a wearer's eyes. In some embodiments, the image sensors 310 includes cameras that face inward from the apparatus 300, for example towards the eyes of a wearer. The image sensors 310 may be processed to detect objects in the environment of the apparatus 300 (e.g., hands, eyes, operator controls, and the like) that are associated with interacting with a virtual environment or depicting virtual elements in the virtual environment.

The apparatus 300 in some embodiments further includes one or more orientation sensors 312. In some embodiments, the orientation sensors 312 include one or more devices that are specially configured to measure orientation or position data associated with the apparatus 300. In some embodiments, the orientation sensors 312 includes at least one gyroscope, accelerometer, magnetometer, LiDAR sensor, inertial measurement unit (IMU), or the like. In some embodiments, the one or more orientation sensors 312 includes one or more image sensors, for example of the image sensors 310, where orientation or position is determined from captured image data. The orientation sensors may detect or measure changes in rotation or position of the apparatus 300. For example, the orientation sensors 312 may measure data indicating the orientation or position of the apparatus 300 as the head mounted device is repositioned via a test stand.

The apparatus 300 in some embodiments further includes one or more motion sensors 314. In some embodiments, the motion sensors 314 include a vibration motion sensor, a passive infrared sensor, a hybrid type sensor, or the like that detects movement or reorientation of the apparatus 300. In some embodiments, the motion sensors 314 include one or more of the orientation sensors 312. In some other embodiments, the motion sensors 314 include one or more of the image sensors 310, for example where movement is detected from captured image data.

In some embodiments, one or more of the circuitry of apparatus 300 is combined into a single module configured to perform some, or all, of the actions described with respect to the individual circuitry. For example, in some embodiments, the processor 302 is combined with one or more of the other circuitry components of the apparatus 300.

Figure 3B:
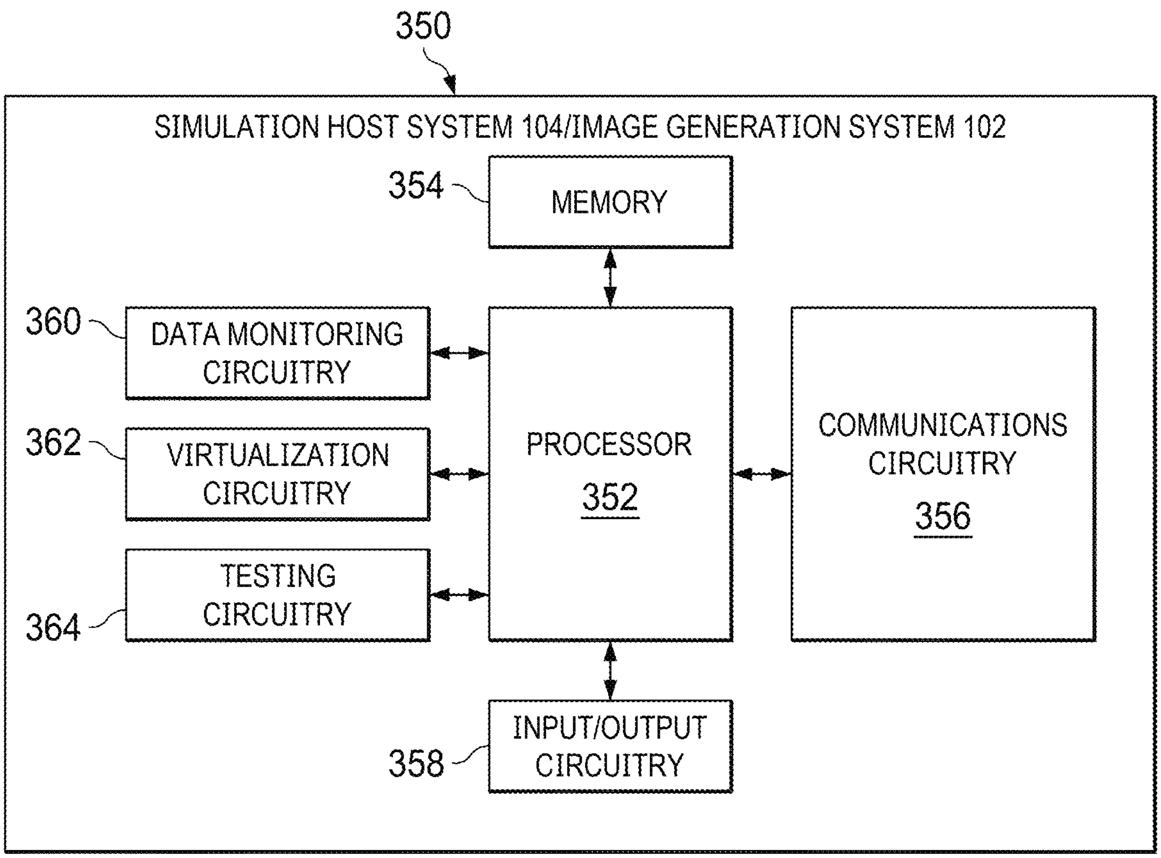
FIG. 3B is a block diagram illustrating an example apparatus in accordance with at least one aspect of the disclosure.

FIG. 3B illustrates a block diagram of an example apparatus in accordance with at least one aspect of the disclosure. Specifically, FIG. 3B depicts an example apparatus 350 embodying an example implementation of the simulation host system 104 or image generation system 102. The apparatus 350 includes a processor 352, a memory 354, a communications circuitry 356, an input/output circuitry 358, data monitoring circuitry 360, virtualization circuitry 362, and testing circuitry 364. The apparatus 350 may be configured, using one or more portions of the circuitry depicted, to execute the operations described herein.

Although the components are described with respect to functional limitations, it should be understood that the particular implementations necessarily include the use of particular hardware. It should also be understood that certain components described herein may include similar or common hardware. For example, two sets of circuitry or modules may both leverage use of the same processor, network interface, storage medium, or the like to perform their associated functions, such that duplicate hardware is not required for each set of circuitry. The use of the term "module" or the term "circuitry" as used herein with respect to components of the apparatus 350 should therefore be understood to include particular hardware configured to perform the functions associated with the particular sets of circuitry as described herein.

Additionally or alternatively, the terms "circuitry" and "module" should be understood broadly to include hardware and, in some embodiments, software or firmware for configuring the hardware. For example, in some embodiments "circuitry" and "module" may include processing circuitry, non-transitory storage media, network interfaces, input/output devices, or the like. In some embodiments, other elements of the apparatus 350 may provide or supplement the functionality of the particular set of circuitry. The processor 352 may provide processing functionality, the memory 354 may provide processing functionality, the memory 354 may provide storage functionality, the communications circuitry 356 may provide network interface functionality, and the like.

An apparatus 350 may include one or more processors 352 and one or more computer readable medium (such as memory 354) storing computer code thereon. References to computer-readable storage medium, computer program product, tangibly embodied computer program, or the like, or a controller, monitor, viewpoint compensation monitoring system, computer, processor, or the like should be understood to encompass not only computers having different architectures such as single or multi-processor architectures and sequential (Von Neumann) or parallel architectures but also specialized circuits such as field-programmable gate arrays (FPGAs), application specific circuits (ASICs), signal processing devices and other devices. References to computer program, instructions, code, or the like, should be understood to encompass software for a programmable processor or firmware such as, for example, the programmable content of a hardware device whether instructions for a processor, or configuration settings for a fixed-function device, gate array or programmable logic device, or the like.

The apparatus 350 may have at least one processor 352 and at least one memory 354, such as a non-transitory computer readable medium, and may include computer program code, that is configured to, with the at least one processor, perform the method described herein. The memory 354 may be a single component or it may be implemented as one or more separate components some or all of which may be integrated or removable and may provide permanent, semi-permanent, dynamic, or cached storage.

The one or more processors 352 are configured to read from and write to the at least one memory 354. The processor may also comprise a bus or an output interface via which data or commands are output by the processor 352 and an input interface via which data or commands are input to the processor 352. The memory 354 stores a computer program including computer program instructions that control the operation of apparatus 350, when loaded into the processor, to enable performance of the viewpoint compensation monitoring methods and implementations of the viewpoint compensation monitoring systems described herein. The processor 352, by reading the memory 354, is able to load and execute the computer program. The computer program or programs may arrive at the apparatus via any suitable delivery mechanism. The delivery mechanism may be, for example, a computer-readable storage medium, a computer program product, a memory device, a record medium such as a compact disc read on only memory (CD-ROM), digital versatile disc (DVD), portable memory such as a memory stick or hard drive, or the like, an article of manufacture that tangibly embodies the computer program. In some embodiments, the delivery mechanism may be a signal configured to reliably transfer the computer program over the air or via an electrical connection.

In some embodiments, the processor 352 (or processor or any other processing circuitry assisting or otherwise associated with the processor) may be in communication with the memory 354 via a bus for passing information among components of the apparatus 350. The memory 354 may be non-transitory and may include, for example, one or more volatile or non-volatile memories. In other words, for example, the memory may be an electronic storage device (e.g., a computer readable storage medium). The memory 354 may be configured to store information, data, content, applications, instructions, or the like, for enabling the apparatus 350 to carry out various functions in accordance with example embodiments of the present disclosure.

The processor 352 may be embodied in any one or more of a myriad of ways and may, for example, include one or more processing devices configured to perform independently. Additionally or alternatively, the processor 352 may include one or more processors configured in tandem via a bus to enable independent execution of instructions, pipelining, or multithreading. The use of the terms "processor," "processing module," and "processing circuitry" may be understood to include a single-core processor, a multi-core processor, multiple processors internal to the apparatus, field-programmable gate array (FPGA), graphic processing unit (GPU), application specific integrated circuit (ASIC), or remote or "cloud" processors.

In an example embodiment, the processor 352 may be configured to execute computer-coded instructions stored in the memory 354 or otherwise accessible to the processor. Alternatively, or additionally, the processor 352 may be configured to execute hard-coded functionality. As such, whether configured by hardware or software methods, or by a combination thereof, the processor 352 may represent an entity (e.g., physically embodied in circuitry) capable of performing operations according to an embodiment of the present disclosure while configured accordingly. Alternatively, as another example, when the processor is embodied as an executor of software instructions, the instructions may specially configure the processor to perform the algorithms or operations described herein when the instructions are executed.

As one example context, the processor 352 may be configured to generate a virtual environment or a particular virtual viewpoint thereof. Additionally or alternatively, in some embodiments, the processor 352 may be configured to request or receive data from one or more other devices, for example positioning information from a motion cueing system or HMD spatial position data from an HMD. Additionally or alternatively, in some embodiments, the processor 352 may be configured to generate virtual adjustment information. The virtual adjustment information may be used to adjust (e.g., by moving) a virtual viewpoint of the virtual environment in response to movement of a HMD. For example, the processor 352 may move the virtual viewpoint via adjusting a position in the virtual environment of a virtual camera based on one or more values of the virtual adjustment information. Additionally or alternatively, in some embodiments, the processor 352 may be configured to record reference data of at least one shape in a virtual viewpoint of a virtual environment, for example reference data representing a position of one or more reference points of a first shape or a second shape. Additionally or alternatively, in some embodiments, the processor 352 may be configured to generate at least one positional displacement vector or at least one orientation displacement angle. Additionally or alternatively, in some embodiments, the processor 352 may be configured to detect a test completion trigger. Additionally or alternatively, in some embodiments, the processor 352 may be configured to determine at least one error based on the at least one positional displacement vector or at least one orientation displacement angle. Additionally or alternatively, in some embodiments, the processor 352 may be configured to determine a test result based on one or more errors. Additionally or alternatively, in some embodiments, the processor 352 may be configured to output a test result to one or more displays.

In some embodiments, the apparatus 350 may include input/output circuitry 358 that may, in turn, be in communication with processor 352 to provide output to the user and in some embodiments, to receive an indication of one or more user inputs. The input/output circuitry 358 may comprise a user interface and may include a display (e.g., for rendering one or more user interfaces, such as to the display). The user interfaces comprise a web user interface, customized device application, native device interface, a mobile or desktop application, or in some embodiments includes a client device linked or otherwise networked to an associated system configuring the virtual environment. In some embodiments, the input/output circuitry 358 may also include gesture controls, soft keys, buttons, a microphone, a speaker, touch areas, or other input/output mechanisms. The processor, such as the processor 352, or the user interface circuitry comprising the processor, for example processor 352, may be configured to control one or more functions of one or more user interface elements through computer program instructions (e.g., software or firmware) stored on a memory accessible to the processor 352 (e.g., via memory 354, or the like).

The communications circuitry 356 may be any means, including for example and without limitation a device or circuitry embodied in hardware, software, firmware, or any combination thereof, which is configured to receive or transmit data from or to a network or any other device, circuitry, or module in communication with the apparatus 350. In this regard, the communications circuitry 356 may include, for example, a network interface for enabling communications with a wired or wireless communications network. For example, the communications circuitry 356 may include one or more network interface cards, antennas, buses, switches, routers, modems, and supporting hardware or software, or any other device suitable for enabling communications via a network. Additionally or alternatively, in some embodiments the communication interface may include the circuitry for interacting with the antennas to cause transmission of signals via the antennas or to adjust receipt of signals received via the antennas.

The apparatus 350 in some embodiments further includes the data monitoring circuitry 360. In some embodiments, the data monitoring circuitry 360 is configured to communicate with one or more devices to receive data for processing. For example, in some embodiments, the data monitoring circuitry 360 is configured to receive positioning information from a motion cueing system, each portion of positioning information representing a movement applied to an HMD on a test stand. The positioning information in some embodiments includes each portion of positioning information representing a movement applied to a HMD on a test stand. The positioning information in some embodiments includes one or more portions associated with one or more times, with each portion being a movement or effect of a movement at a particular time in a time series. Additionally or alternatively, in some embodiments, the data monitoring circuitry 360 is configured to receive HMD spatial position data associated with an HMD from the HMD or one or more sensors thereof. The HMD spatial position data associated with the HMD in some embodiments represents a change in position (e.g., via translation and/or orientation) detected by the HMD via one or more sensors thereof or otherwise associated with the monitoring movement of the HMD. The data monitoring circuitry 360 may continuously communicate with one or more of such devices.

The apparatus 350 in some embodiments further includes virtualization circuitry 362. In some embodiments, the virtualization circuitry 362 is configured to generate or configure a virtual environment, or one or more virtual elements therein. For example, in some embodiments the virtualization circuitry 362 generates a virtual environment that includes at least a first shape and a second shape. In some embodiments, the virtualization circuitry 362 configures at least a first shape and a second shape for depicting within a virtual viewpoint of the virtual environment. Additionally or alternatively, in some embodiments, the virtualization circuitry 362 is configured to adjust the virtual viewpoint, or one or more of the shapes in the virtual environment, based on received data. For example, in some embodiments, the virtualization circuitry 362 is configured to update a position of a virtual viewpoint in the virtual environment to depict adjustments during testing of the virtual viewpoint and a first shape affixed in the virtual viewpoint, such that the position of the virtual viewpoint and first shape depicted therein adjusts with respect to the second shape. In some such embodiments, the virtualization circuitry 362 is configured to generate virtual adjustment information, or apply the virtual adjustment information to a virtual viewpoint of a virtual environment for outputting.

The apparatus 350 in some embodiments further includes testing circuitry 364. In some embodiments, the testing circuitry 364 is configured to detect a test completion trigger that indicates a request to generate a test result for a testing procedure. In some embodiments, the testing circuitry 364 records reference data associated with one or more shapes. In some embodiments, the testing circuitry 364 generates at least one positional displacement vector or at least one orientation displacement angle. In some embodiments, the testing circuitry 364 determines at least one error based on at least one positional displacement vector or at least one orientation displacement. In some embodiments, the testing circuitry 364 determines a test result based on at least one error, for example a HMD orientation tracking error or a HMD movement tracking error. In some embodiments, the testing circuitry 364 determines an offset based on a pixel difference between at least one reference point of each of a first shape and a second shape represented in a virtual viewpoint, or in some embodiments determines an offset based on a difference between a reference position of a reference point of each of the first shape and the second shape in the virtual environment.

In some embodiments, one or more of the circuitry of apparatus 350 is combined into a single module configured to perform some, or all, of the actions described with respect to the individual circuitry. For example, in some embodiments, the processor 352 is combined with one or more of the other circuitry components of the apparatus 350.

In some embodiments, virtual elements are generated or maintained by one or more systems or devices of the system 100. For example, in some embodiments, the simulation host system 104 or the image generation system 102 are configured to generate, render, or otherwise process data associated with the virtual elements as depicted and described herein. The virtual elements may be used in one or more processes for measuring viewpoint compensation, testing viewpoint compensation as a HMD is moved, or the like as described herein.

Figure 4:
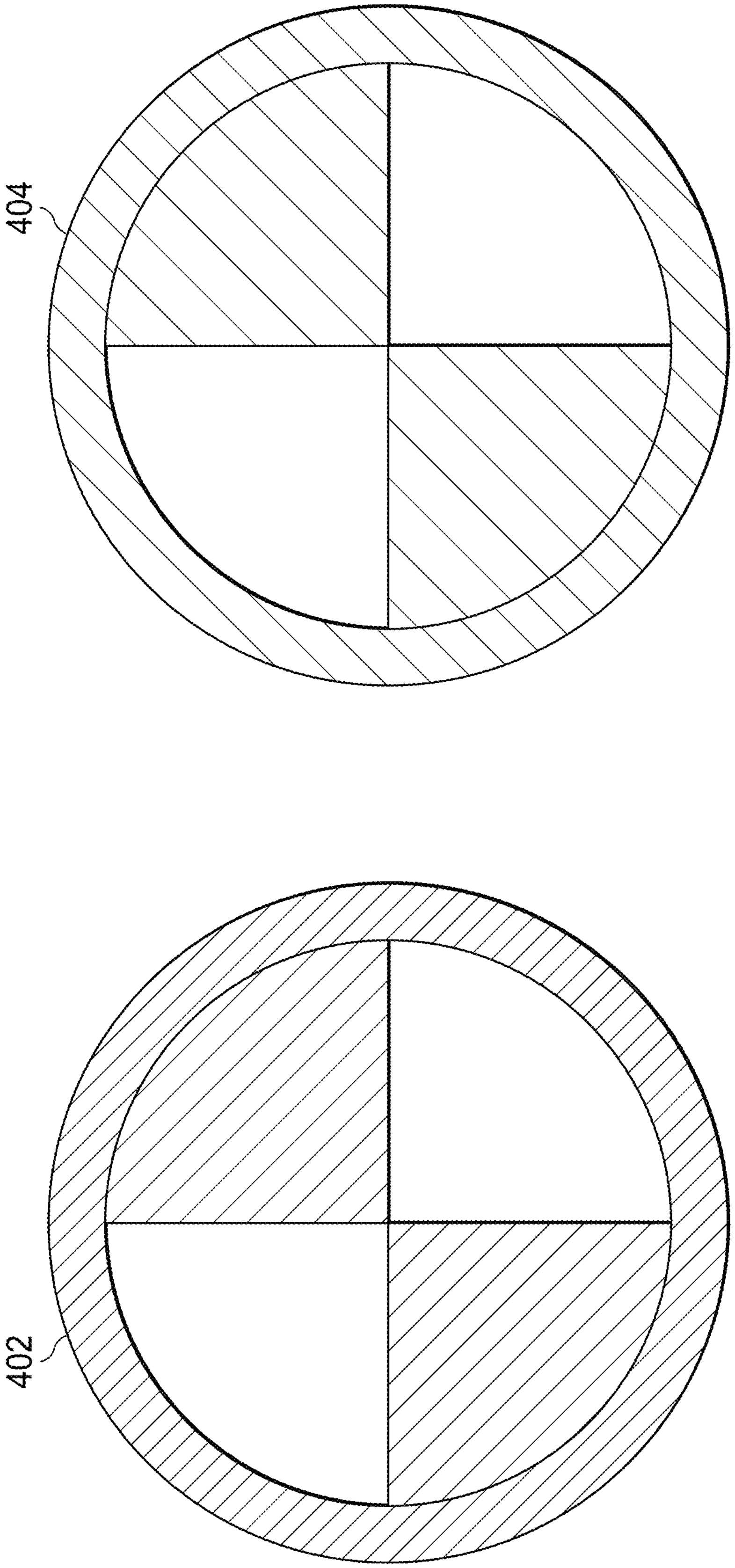
FIG. 4 is a shape diagram illustrating example shapes in accordance with at least one aspect of the disclosure.

FIG. 4 illustrates a depiction of example shapes in accordance with at least one aspect of the disclosure. Specifically, FIG. 4 depicts a first shape 402 and a second shape 404. The first shape 402 and the second shape 404 embody virtual elements that are renderable within a virtual environment. For example, in some embodiments, the first shape 402 or the second shape 404 are renderable within a virtual viewpoint of a virtual environment. In some embodiments, the first shape 402 and the second shape 404 are each assigned positions in the virtual environment utilized for rendering. Additionally or alternatively, in some embodiments the first shape 402 or the second shape 404 are assigned positions as user interface elements renderable on top of a virtual viewpoint of a virtual environment.

In some embodiments, the first shape and the second shape are rendered within a virtual environment that includes one or more additional virtual elements. For example, in some embodiments, a third shape is rendered within the virtual environment that surrounds the virtual viewpoint. In some embodiments, the third shape is a black sphere, which optionally may obscure or otherwise block rendering of one or more other virtual elements in the virtual environment that are behind the black sphere. The black sphere may be centered on the virtual viewpoint. In this regard, the third shape may form a background of the virtual viewpoint during a testing procedure described further herein.

As illustrated, the first shape 402 includes a circular shape form. The circular shape form includes an inner portion and an outer portion. The outer portion of the first shape 402 forms the circular shape and provides a boundary of the first shape 402. The inner portion of the first shape 402 includes one or more sub-portions, for example four quadrants of an inner circle as depicted. In some embodiments, one or more of the portions (e.g., quadrants) may be cut out from the first shape 402, such that visibility behind the first shape 402 is provided via one or more of the cut out portions. For example, as illustrated, the first shape 402 includes a top left cut out portion and a bottom right cut out portion. It will be appreciated that although FIG. 4 depicts quadrants of an inner shape including two cut out portions, in other embodiments any number of cut out portions or shapes may be included.

In some embodiments, a second shape is provided that embodies the same shape form as the first shape. For example, as illustrated the second shape 404 includes the same circular shape form as the first shape 402. Additionally or alternatively, in some embodiments the second shape includes at least one of the same cut out portions as the first shape, for example where the second shape 404 includes a top left cut out portion and a bottom right cut out portion. In this regard, visibility beyond the second shape 404 is provided in circumstances where at least one cut out portion of both the first shape 402 and the second shape 404 remain at least partially overlapping.

In some embodiments, the first shape 402 and the second shape 404 are configured such that visibility is provided through the cut out portions of the first shape 402 and the second shape 404 in circumstances where first shape 402 and the second shape 404 are at least partially overlapping. Additionally or alternatively, in some embodiments the cut out portion of one shape (e.g., the first shape) allows visibility to alignment of that shape with another shape (e.g., the second shape) positioned at least in part behind the one shape. The shape form of the second shape 404 located behind may be used to indicate an offset with the first shape 402. For example, if the left side of the second shape 404 is visible through a bottom right cut out portion of the first shape 402, it may be determined that the first shape 402 is offset to the left or up from the second shape 404. Similarly, if the right side of the second shape 404 is visible through a top left cut out portion of the first shape 402, it may be determined that the first shape is offset to the right or down from the second shape 404.

In some embodiments, the first shape 402 is visually distinguishable from the second shape 404. The first shape 402 and the second shape 404 may be visually distinguishable using any means available to enable a user (e.g., a viewer) to differentiate a boundary of the first shape 402 from a boundary of the second shape 404. For example, in some embodiments the first shape 402 and the second shape 404 are rendered with different colors, patterns, contrasts, or other visual alterations that visually distinguish the first shape 402 and the second shape 404.

In some embodiments, each of the first shape 402 and the second shape 404 may include any number of defined points along the shape. For example, each of the first shape 402 and a second shape 404 include a center point, where the center point may be defined at a particular position within the virtual environment or within a virtual viewpoint of a virtual environment, for example. Additionally or alternatively, in some embodiments each of the first shape 402 and the second shape 404 include a center point of a first cut out portion (e.g., a top left cut out portion), a center point of a second cut out portion (e.g., a bottom right cut out portion), a right hemisphere midpoint, a left hemisphere midpoint, a top hemisphere midpoint, a bottom hemisphere midpoint, a right boundary point, a left boundary point, a top boundary point, a bottom boundary point, or the like. It will be appreciated that any point may be defined along, within, or with respect to a particular shape, for example the first shape 402 or the second shape 404.

In some embodiments, a virtual viewpoint of a virtual environment is configured to adjust in response to one or more inputs. For example, in some embodiments a virtual viewpoint is updated in response to movements of a HMD, such as via movement or rotation along a test axis via a test stand. In one context, if a head mounted device is rotated to the right, the virtual viewpoint of the virtual environment may similarly be rotated in a right direction within the virtual environment, for example via rotation of a virtual camera that is positioned in the virtual environment and captures the virtual viewpoint.

Additionally, in some embodiments, a shape (e.g., the second shape 404) is configured to be affixed in a position within the virtual environment, such that visualization of the shape is dependent on the position or orientation of the element that captures a virtual viewpoint of the virtual environment (e.g., via a virtual camera). For example, the shape (e.g., the second shape 404) may be affixed at a particular position within the virtual environment itself. In this regard, the shape may not move position within the virtual environment as the virtual viewpoint is adjusted, however the position of the shape as rendered in the virtual viewpoint of the virtual environment may be adjusted as the virtual viewpoint adjusts in position or orientation within the virtual environment based on where the shape is within the virtual viewpoint. As one example context, if a virtual viewpoint includes a rendering of a shape affixed to the virtual environment and then the virtual viewpoint is translated from a starting position to the left while the shape affixed to the virtual environment is within the virtual viewpoint, the shape that is affixed within the virtual environment will be depicted at a position more to the right within the virtual viewpoint.

Additionally, in some embodiments, a shape (e.g., the first shape 402) is configured to be affixed within the virtual viewpoint of the virtual environment. In this regard, the shape affixed within the virtual viewpoint of the virtual environment may remain depicted in the same position of the virtual viewpoint even as the virtual viewpoint is adjusted. As a virtual viewpoint is updated in the virtual environment, the position of the shape affixed to the virtual viewpoint may similarly be updated to ensure that the shape remains depicted in the same position within the virtual viewpoint. Thus, as the virtual viewpoint of the virtual environment is adjusted, the position of the shape affixed within the virtual viewpoint moves with it. This can be envisioned as a fixed shape securely fastened to a viewing mechanism, for example a sticker attached to lenses of glasses worn by a wearer, where the sticker remains in the same position within the wearer's vision as the wearer adjusts their head to change what is depicted in their vision.

In some embodiments, a virtual viewpoint in the virtual environment is captured via a virtual camera positioned in the virtual environment. In this regard, the virtual camera may be adjusted based on movement of a HMD alone or together with input of one or more other controls. For example, the virtual camera may be placed within a virtual environment and be configured to reorient to mirror the HMD based on data indicating movement of the HMD. In this regard, as the HMD is rotated a direction for example, the virtual camera may similarly be rotated the same direction within the virtual environment, and as the HMD is translated in a direction, the virtual camera may similarly have its position translated in that same direction within the virtual environment. As a result, the virtual viewpoint captured by the virtual camera may similarly reflect such adjustments as a field of view of the virtual camera is adjusted due to such movements.

By being affixed in the virtual viewpoint, the first shape remains in the same position of the virtual viewpoint at all times regardless of the movements of the HMD or adjustments resulting therefrom, and may move position within the virtual environment to achieve this parity with the virtual viewpoint. For example, the first shape may be centered in the virtual viewpoint and rendered to be depicted in front of other shapes. In other embodiments, the first shape is rendered such that it may be behind another shape (e.g., behind a second shape) when such shapes are aligned. A second shape may have its position within the virtual viewpoint adjusted as the HMD is moved, such that the distance between the first shape and the second shape in the virtual viewpoint may adjust as a movement occurs. For example, in some embodiments, the second shape is affixed within the virtual environment but not within the virtual viewpoint, such that adjustments to the virtual camera change the relative position of the second shape with respect to the adjusted virtual viewpoint. The second shape thus has its position within the virtual viewpoint updated without changes to the underlying position of the second shape itself within the virtual environment. In this regard, the first shape may serve as a static targeting shape that may be used to test whether movement of a HMD results in proper realistic adjustments in the virtual environment, or in errors between accurately mirroring movement of the HMD to adjustments in the virtual viewpoint, based on comparison with the second shape. For example, errors in operation of a HMD may cause improper viewpoint compensation based on HMD spatial position data gathered by the HMD not sufficiently mirroring the movement of the HMD. In this regard, the offset between the first shape and the second shape may be depicted to visually indicate to at least one user when an offset is detected, and may be utilized to objectively measure, quantify, or test such an offset in a data-driven manner.

A position displacement between two shapes is determinable based on positions of a same type of point between the two shapes. In this regard, a type of point of a shape may be utilized as a reference position of that shape, where reference data representing the position of that reference at a single time or at a plurality of times. For example, in some embodiments, a position displacement may be determined based on a difference between a position of a center point of the first shape 402 and a center point of the second shape 404. Additionally or alternatively, in some embodiments, a position displacement may be determined based on a difference between a position of a left point of the first shape 402 and a left point of the second shape 404. In some embodiments, a positional displacement vector is determinable or generable from comparing the reference data of the first shape with reference data of the second shape, for example by comparing positions associated with different types of points on the first and second shape at one or more times. In some embodiments, a position displacement is determined based on a number of pixels between a position in the virtual viewpoint of the first shape and a position in the virtual viewpoint of the second shape.

Figure 5:
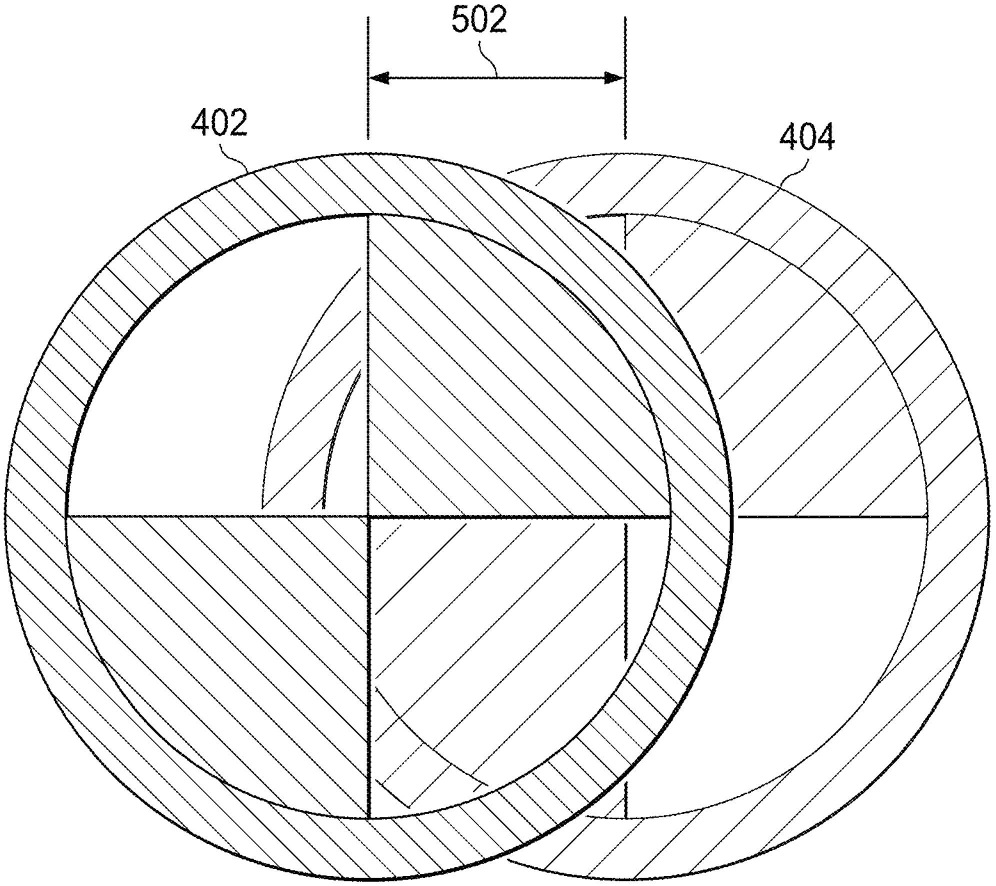
FIG. 5 is a shape diagram illustrating example shapes at a position displacement in accordance with at least one aspect of the disclosure.

FIG. 5 illustrates a depiction of example shapes at a position displacement in accordance with at least one aspect of the disclosure. Specifically, FIG. 5 depicts a position displacement 502 between the first shape 402 and the second shape 404. As depicted, the position displacement 502 represents an offset determined from a center point of the first shape 402 and a center point of the second shape 404. In some embodiments, the position displacement 502 represents a position displacement vector for at least one time based on the difference in position between the center point of the first shape 402 and the center point of the second shape 404. The position displacement 502 represents an influence on the HMD of the movement applied to the test stand. The position displacement 502 in some embodiments is caused by a mismatch between data representing a movement of the HMD and a corresponding adjustment made to the virtual viewpoint based on such a movement, for example where movement of the HMD has been caused by a motion cueing system without sufficient and timely compensation for the virtual viewpoint.

In a circumstance where the first shape 402 and the second shape 404 are associated with the position displacement 502, the shapes are not in alignment, such that there is a visible offset between the first shape 402 and the second shape 404. In some embodiments, the position displacement 502 results from a movement of a HMD that, when utilized to generate virtual adjustment information that is applied to adjust a virtual viewpoint of a virtual environment, adjusts the virtual viewpoint via a translation, rotation, or both. For example, the adjustment via the HMD may result from a movement of a test stand along a test axis, such as a movement triggered by a motion cueing system. In some embodiments, the movement is of a motion cueing system that applies motion to the test stand, for example where the motion cueing system moves to an excursion value (e.g., a particular test point or a maximal point) along the test axis, such as from a neutral value or other value along the test axis. Additionally or alternatively, in some embodiments, the movement is of the motion cueing system that applies motion to the test stand when moving from the excursion value to the neutral value or another value.

Figure 6:
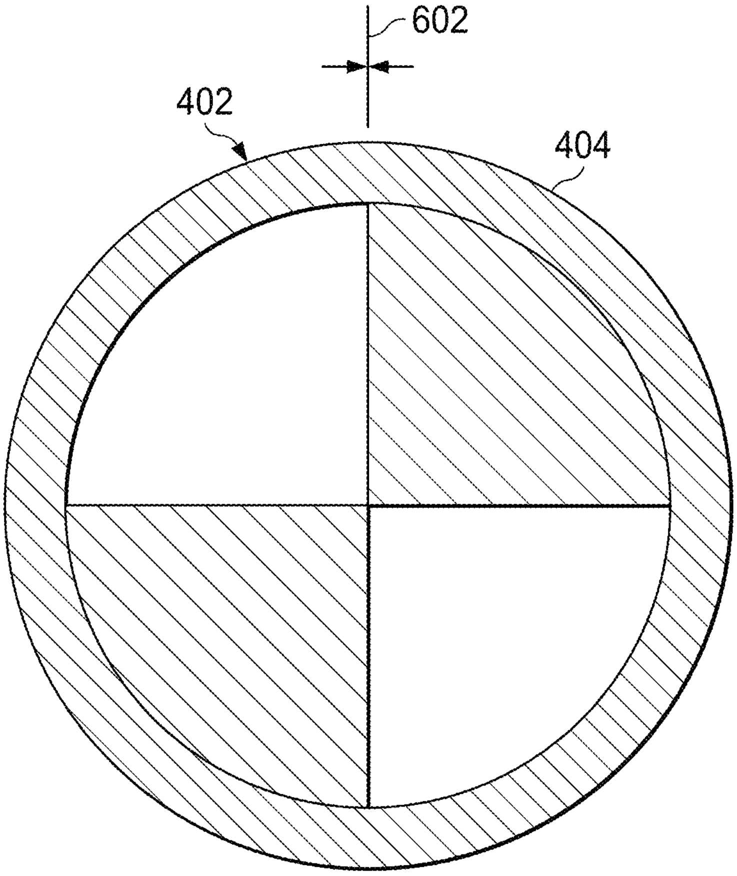
FIG. 6 is a shape diagram illustrating example shapes at another position displacement in accordance with at least one aspect of the disclosure.

FIG. 6 illustrates a depiction of example shapes at another position offset in accordance with at least one aspect of the disclosure. Specifically, FIG. 6 depicts a position displacement 602. Similar to the position displacement 502, the position displacement 602 is depicted as an offset between a center point of the first shape 402 and a center point of the second shape 404. The first shape 402 and the second shape 404 are in a preferred alignment as depicted in FIG. 6, such that no (or almost no) visible offset is present between the two shapes. It will be appreciated that, as a result, the position displacement 602 may include at least one smaller offset value than the position displacement 502 to represent the smaller offset between the first shape 402 and the second shape 404.

Figure 7:
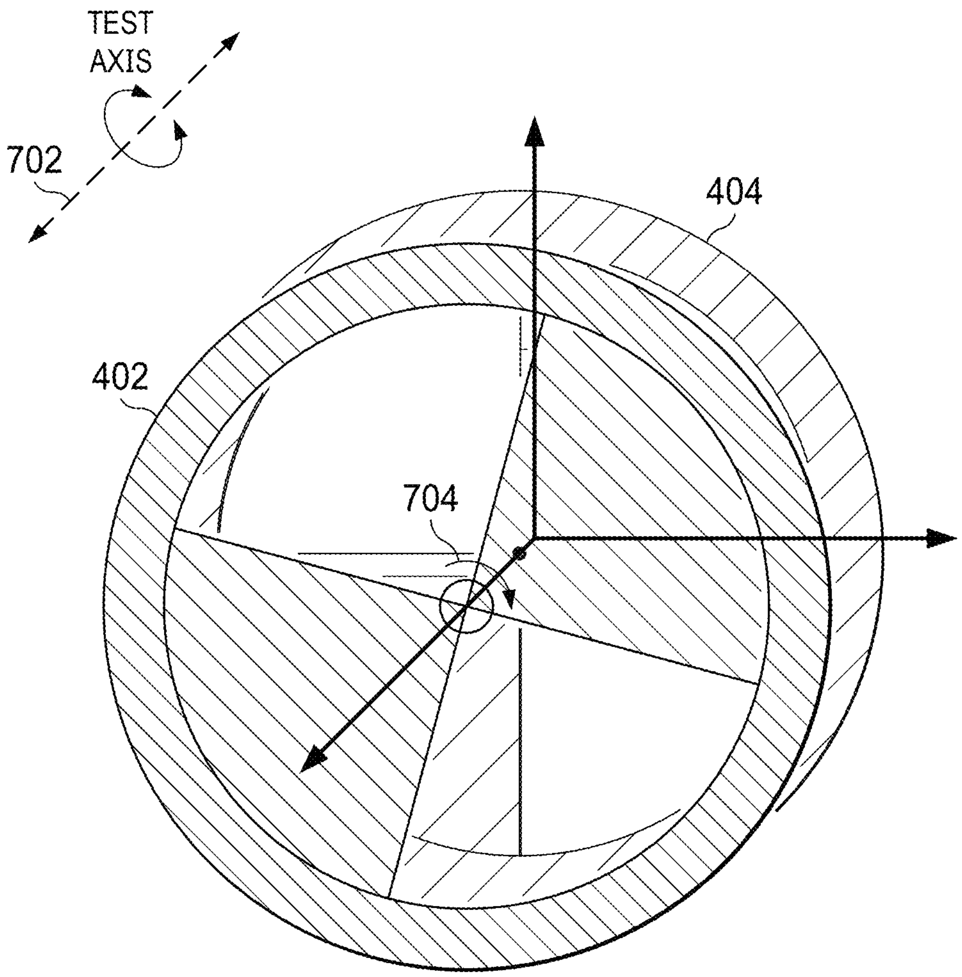
FIG. 7 is a shape diagram illustrating an example orientation displacement angle in accordance with at least one aspect of the disclosure.

FIG. 7 illustrates a depiction of an example orientation displacement angle in accordance with at least one aspect of the disclosure. Specifically, FIG. 7 depicts an orientation displacement angle 704 around a test axis 702. The orientation displacement angle 704 represents an angle of offset between an orientation of the first shape 402 and an orientation of the second shape 404. For example, the orientation may be compared with respect to a forward (e.g., longitudinal) direction of a three dimensional environment, such as a forward direction of the test axis 702. It should be appreciated that the first shape 402 and the second shape 404 may be additionally associated with a position offset along the test axis 702 in addition to the orientation displacement angle representing the orientation offset between such shapes, for example the position offset as depicted and discussed with respect to FIG. 5 or 6.

In some embodiments, in a circumstance where the first shape 402 and the second shape 404 are associated with the orientation displacement angle 704, the shapes are not in alignment, such that there is a visible offset between the orientation of the first shape 402 and the orientation of the second shape 404. The orientation offset corresponds to a rotation of the first shape 402, for example as compared to the second shape 404 that remains non-rotated (e.g., at an angle of 0) with respect to the test axis 702. In some embodiments, an orientation displacement angle may be determined in addition to the position displacement between a first shape and a second shape. In this regard, a position displacement vector or an orientation displacement angle (e.g., represented as a value or another vector) may each or both be determined based at least in part on comparisons between a same type of reference point, or plurality of reference points, associated with the first shape and the second shape.

In some embodiments, at least one shape is configured such that its position adjusts in the virtual viewpoint of the virtual environment and at least one shape is affixed to a particular position within the virtual viewpoint of the virtual environment. In this regard, an offset may be caused by a difference in position or rotational angle between one or more reference points of the first shape and second shape after or during a movement of an HMD. For example, in some embodiments, a second shape is configured to have an adjustable position in a virtual viewpoint (e.g., remaining fixed in the virtual environment), and the first shape is affixed at a particular position depicted in the virtual viewpoint of the virtual environment (e.g., by adjusting its position within the virtual environment together with adjustments to the virtual viewpoint of the virtual environment). Such an offset may occur during a testing procedure as discussed further herein after a HMD is affected by motion applied to a test stand when a motion cueing system is moved to an excursion value. For example, in some embodiments, the adjustment (e.g., performed by a simulation host system or an image generation system for example) of the virtual viewpoint results in an adjustment of the second shape position in the virtual viewpoint occurs during a movement from a starting position (e.g., a neutral position) to an excursion position, or from an excursion position back to the starting position. In this regard, data associated with the movement of the HMD (e.g., HMD spatial position data detected by the HMD and corresponding positioning information representing a movement of the motion cueing system applying motion that affects the HMD, such as by applying such motion to the test stand) may be received and utilized to adjust the virtual viewpoint and thus the corresponding position of the second shape within the virtual viewpoint. During such times, reference data associated with one or more reference points along or otherwise associated with the first shape or the second shape may be recorded and utilized to determine whether a testing procedure is passed or failed at one or more times in a time series.

In one example context, embodiments continuously receive signals from a motion cueing system that indicate movements being performed by the motion cueing system. In circumstances where no movement is currently being performed, such signals may include positioning information that indicates no movement in positioning is being performed. Similarly, during a movement performed by the motion cueing system, the motion cueing system continuously provides positioning information representing the movement currently being performed. Additionally, and at the same time, an HMD may send one or more signals indicating registered movement of the HMD. In this regard, in some embodiments, the HMD sends one or more signals containing sensor data of the HMD that indicates such movements. In some embodiments, the positioning information associated with a motion cueing system and the HMD spatial position data associated with the HMD may be combined. The resulting combined data (e.g., virtual adjustment information) may be used to adjust the position of the virtual viewpoint in the virtual environment based on such data, for example to adjust a position or orientation of the virtual element (e.g., a camera) that captures the virtual viewpoint within the virtual environment. In an ideal context, the movement represented by the positioning information and the movement represented by the HMD spatial position data negate one another such that no change in the position of the virtual viewpoint results, and thus a first shape and a second shape within the virtual viewpoint of the virtual environment remain aligned. The virtual adjustment information may then be used to render the virtual viewpoint of the virtual environment, or update a position of the virtual viewpoint (e.g., based on an offset represented in the virtual adjustment information).

The testing procedure may be performed to measure and quantify undesirable effects of changes in a position or orientation of a virtual viewpoint caused by a movement of a HMD. For example, the testing procedure may measure and quantify whether changes in a position or orientation of a HMD due to motion, vibrations, or other physical effects initiated during simulation (e.g., effectuated by a motion cueing system of a simulation apparatus) affect a simulation apparatus from displaying a realistic scenario. In this regard, ensuring a sufficient level of fidelity in the movement of the HMD and the corresponding movement of the virtual viewpoint (in a process discussed as viewpoint compensation) is desirable to avoid negative effects caused by such influences, for example motion sickness or an unrealistic viewpoint that may be felt by an operator while wearing the HMD. By using the reference data associated with virtual elements, for example a first shape and a second shape, to detect offset and derive related error values, the temporal quality of the virtualized simulation system may be tested in an objective and comparable manner. Additionally, by allowing for output to one or more displays, some such embodiments further allow for visual confirmation of such testing via human visual analysis. Such advantages are provided while simultaneously minimizing impacts on electrical power usage, minimizing expensive or complex additional components, and utilizing streamlined data analysis techniques to reduce complexity.

As an HMD is moved (e.g., in response to movement of a test stand to which the HMD is secured), at least position of a second shape in a virtual viewpoint may be adjusted based on updated data received in response to the HMD movement. In some embodiments, an offset between two shapes indicates one or more errors in alignment between the first shape and the second shape at a certain point in the test procedure, for example where such errors indicate problems with operation of an HMD or one or more other hardware, software, or other components of a simulation apparatus.

In this regard, in some contexts, an offset between a first shape and a second shape may be visually depicted and continually adjust where needed as updates to the first and second shape are depicted (e.g., changing center points or other reference points between the two shapes are updated to indicate an error). The offsets between the first shape and the second shape may be utilized to determine a particular test result indicating whether a test procedure was passed successfully or failed, which may be indicated via data-driven determination or visually, or both. Additionally or alternatively, in some contexts, reference data associated with one or more reference points of the first shape and the second shape may be compared to determine data representing the offset between the two shapes (e.g., a positional displacement vector or orientation displacement angle). At least one error associated with an HMD or other component may be determined based on the data representing the offset (e.g., a HMD movement tracking error based on at least one positional displacement vector or HMD orientation tracking error based on at least one orientation displacement angle). Measuring and testing of such viewpoint compensation may be performed utilizing such visual verification, data-based verification, or both.

Figure 8:
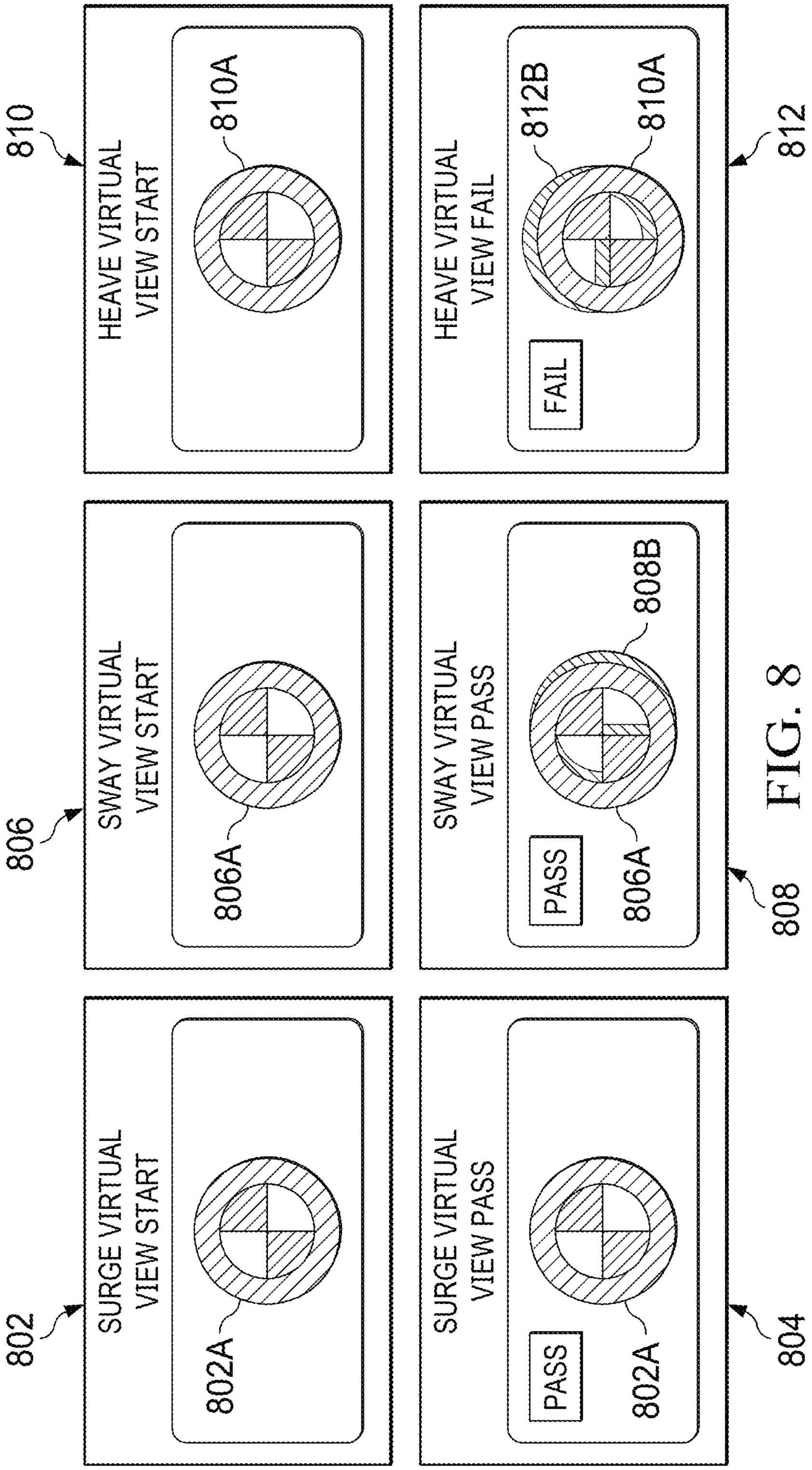
FIG. 8 is a shape diagram illustrating example viewpoint compensation tests and test results in accordance with at least one aspect of the disclosure.

FIG. 8 illustrates a depiction of example viewpoint compensation tests and test results in accordance with at least one aspect of the disclosure. Specifically, FIG. 8 depicts visualizations including renderings of different shapes, including such shapes (e.g., a first shape and a second shape) at starting positions within virtual viewpoints, and such shapes at corresponding positions at a time at which a determination of a test result is performed, during a test procedure for various test axes. The second time may be when the test procedure is triggered to determine at least one test result, such as a test result indicating whether one or more errors from reference data associated with the first shape and second shape are within corresponding thresholds. In some embodiments, a passing test result is determined in circumstances where the errors derived from reference data associated with a first shape and a second shape are within corresponding thresholds, or a failed test result is determined in circumstances where errors derived from reference data associated with a first shape and a second shape are not within the corresponding thresholds.

In some embodiments, the test procedures are performed over a time series. For example, reference data for each shape may include positions of reference points at various different times. In some embodiments, a test procedure is determined to have a failed test result in a circumstance where, for any particular time in the time series or a particular percentage of times, an error derived from reference data associated with a first shape and a second shape are not within corresponding thresholds. In some embodiments, a test procedure is determined to have a passed test result in a circumstance where, for all times in the time series or a certain percentage of times, an error derived from reference data associated with a first shape and a second shape are within corresponding thresholds. For example, in some embodiments, if errors associated with a certain number of times or a certain number of continuous times in a time series are determined not within corresponding thresholds, only then is a failed test result raised for the test procedure. In some embodiments, once a test completion trigger is detected, a test result is generated for a particular number of times in a time series.

As illustrated, FIG. 8 includes a visualization 802 of shapes at starting positions for a surge axis test procedure and a visualization 804 of the shapes at second (e.g., test) positions for the surge axis test procedure. FIG. 8 further includes a visualization 806 of shapes at starting positions for a sway axis test procedure and a visualization 808 of the shapes at second positions for the sway axis test procedure. FIG. 8 further includes a visualization 810 of shapes at starting positions for a heave axis test procedure and a visualization 812 of the shapes at second positions for the heave axis test procedure. Each of the visualizations may represent a portion of a virtual viewpoint of a virtual environment at a particular time, for example a virtual viewpoint within which a first shape and a second shape are rendered in response to input or output data controlling adjustment of the virtual viewpoint or one or more elements rendered therein.

For each testing procedure, a test stand to which a HMD is secured may be locked for operation in any number of directions. For example, in some embodiments, the test stand is locked such that movement (e.g., translation and/or rotation for example) cannot occur in any direction, including a test direction. In this regard, while the test stand is locked, the test stand may not be permitted to move in any direction independent from itself, and the entirety of the test stand may move in accordance with a movement applied to it by a motion cueing system. For example, if a motion cueing system rotates along a test axis while the test stand is locked, the entirety of the test stand may rotate in the direction of that rotation together with the motion cueing system.

In visualization 802, a first shape 802A is at a first (e.g., starting) position within the virtual viewpoint. A second shape is aligned with the first shape 802A, such that the second shape is rendered under (or "behind") the first shape 802A and thus is not visible due to the rendering of the first shape. In this regard, the visualization 802 depicts a near-perfect alignment between at least one position of at least one reference point of the first shape 802A and at least one position of at least one corresponding reference point of the second shape. In some embodiments, the reference point of each shape matches for comparison, for example the reference point is a center point of each shape, a corner point of a cutout portion of the shape, or the like.

The visualization 804 is rendered with respect to a second time associated with the test procedure. For example, in some embodiments, the visualization 804 is captured at a time after a movement of a particular HMD, such as along a surge test axis from first value to an excursion value. The visualization 804 may be captured upon detecting a test completion trigger, for example after a timer that defines a time between captured visualizations, after receiving a control input from a user or simulation operator, after receiving a control input from an automated system or data-driven determination, or the like. In some embodiments, the visualization 804 is one of a plurality of visualizations captured or otherwise generated at different times along a particular movement of an HMD, for example movement of a motion cueing system and applied to a test stand from a neutral value to an excursion value (e.g., a maximum excursion value) along the surge test axis, or a movement of a motion cueing system and applied to a test stand that returns to the neutral value from the excursion value.

In some embodiments, the test stand is moved via a motion cueing system. In some embodiments, positioning information corresponding to the movement is received from the motion cueing system for processing. For example, the positioning information may indicate the movement of the motion cueing system and applied to the test stand was initiated from a first position (e.g., a neutral position) to an excursion value along the test axis. The positioning information in some embodiments is processable to generate corresponding virtual adjustment information, for example via combination with HMD spatial position data measured during the movement. In some embodiments, the resulting virtual adjustment information is utilized to adjust the position of the second shape within the virtual viewpoint of the virtual environment.

In visualization 804, the first shape 802*a* is depicted at a second position after the movement. The second shape remains aligned with the first shape 802A, for example at or significantly close to the first shape 802A at the second position. In this regard, the second shape remains not visible in the visualization 804, as it is blocked by the first shape 802A at the second position. In some embodiments, the first shape 802A returns to or remains in the same position after the movement, such that the second position is the same as or remains aligned with the first position depicted in visualization 802. As the first shape 802A remains affixed in the virtual viewpoint, the first shape 802A is centered within the virtualized viewpoint as depicted.

Reference data associated with a first shape at one or more positions may be recorded, and reference data associated with the second shape at one or more positions may similarly be recorded. In some embodiments, the reference data includes center point positions for each of the first shape and the second shape. In some embodiments, only the reference data of the first shape may be recorded, as the second shape should remain in an affixed position within the virtual environment. Additionally, in some embodiments, the reference data for the first and second shape may be used to generate a positional displacement vector or an orientation displacement angle at a given time. For example, the positional displacement vector or orientation displacement angle may be generated by at least comparing the reference data of the first shape with the reference data of the second shape for a given time. In some embodiments, the positional displacement vector includes data indicating an offset between a position of a reference point of the first shape with a position of a corresponding reference point of the second shape, such as by comparing the position of the first shape (e.g., the second position of the first shape 802A depicted in the visualization 804) and the position of the second shape in the reference data. Additionally or alternatively, the orientation displacement angle in some embodiments includes data indicating an angle offset between the position of the first shape and the position of the second shape, for example with respect to a test axis. In this regard, the orientation displacement angle is generated, from the reference data by comparing at least a position of the same at least one reference point associated with each shape to determine an offset in the orientation (e.g., a rotation) of the first shape 802A to the orientation of the second shape, with respect to a particular test axis.

In some embodiments, the reference data for a particular shape includes data representing a position of a reference point of that shape within the virtual environment. In this regard, each portion of reference data may indicate the position of that reference point of the shape in the coordinate system of the virtual environment (e.g., a 3D coordinate system). In some such embodiments, a reference position corresponding to at least one reference point of the second shape may be predetermined or otherwise known without capturing or re-capturing reference data, as the second shape is affixed within the virtual environment. Some such embodiments record reference data associated with the first shape, unlike the second shape, to capture updates to a reference position for a reference point of the first shape as an HMD is moved. In some embodiments, the reference data includes positions of a particular reference point of a corresponding shape with respect to the virtual viewpoint. In this regard, the coordinate system corresponding to the virtual viewpoint rendered to a particular display (e.g., a display of an HMD) may be utilized to define the position of the reference point.

In some embodiments, one or more errors are determined based on the offset of the reference points of the first shape 802A and second shape. For example, in some embodiments, an HMD movement tracking error is determined based on the positional displacement vector determined representing the positional offset of the shapes. For example, the HMD movement tracking error may include one or more values representing the offset of the first shape 802A from the second shape based on at least one of the distance offsets of positions between center points, top points, bottom points, left points, right points, or one or more other reference points of the two shapes. Additionally or alternatively, in some embodiments, an HMD orientation tracking error is determined based on the orientation displacement angle. For example, the HMD orientation tracking error may include one or more values representing one or more angles of offset between the first shape 802A and the second shape based on at least one of the angles between positions of center points, top points, bottom points, left points, right points, or one or more reference points of the two shapes.

Some embodiments further determine test results, for example test results corresponding to the one or more initiated test procedures, based on the determined one or more errors. For example, in some embodiments, a test result for a test procedure is based on whether a HMD movement tracking error is within a particular threshold, or whether a HMD orientation tracking error is within a particular threshold. In some embodiments, a test procedure is passed (e.g., a test result embodying a passed result is raised) in a circumstance where a HMD movement tracking error and a HMD orientation tracking error are both within corresponding thresholds. Similarly, in some embodiments, a test procedure is failed (e.g., a test result embodying a failed result is raised) in a circumstance where the HMD movement tracking error is not within a corresponding threshold, or the HMD orientation tracking error is not within a corresponding threshold, or both are not within their corresponding thresholds.

In some embodiments, for example where reference data includes multiple portions of reference data representing data recorded across different times in a particular time series, a test procedure is failed in a circumstance where failed results are raised corresponding to a particular number, particular percentage, or particular threshold number of portions of reference data for such times. For example, in some embodiments, a failed test result for a test procedure is raised in a circumstance where portions of reference data associated with X consecutive times each are determined to indicate a failed test result, where X is a number greater than or equal to 1. X may be a threshold number of time frames for a particular system that is set by a user, pre-determined, or otherwise set. In some embodiments, X represents a number of time frames that, if an offset is detected between shapes, a human may be negatively affected by visual disparities in a virtual viewpoint of a virtual environment between a rendered position and an intended position based on recorded data.

As illustrated in visualization 804, the test procedure raises a passed test result. In this regard, the offsets between the first shape 802A at the second position and the second shape positioned behind the first shape at the second position satisfies one or more corresponding thresholds. For example, as illustrated the positional and angular offsets between the first shape 802A and the second shape are zero or near-zero, such that the corresponding HMD movement tracking error or HMD orientation tracking error may similarly be minimal and satisfy many thresholds.

This test procedure may be repeated for any test axis, and any number of test axes. For example, as illustrated, FIG. 8 includes a visualization 806 of the starting positions for a sway axis test procedure, which similarly depicts representations of a first shape and a second shape. The second shape is aligned with the first shape 806A (e.g., such that the second shape is not visible to the user as the second shape is blocked by the first shape). Specifically, visualization 806 includes the first shape 806A at a first position, with the second shape depicted behind the first shape at the first position.

As the HMD is moved (e.g., via a movement of a test stand to which the HMD is secured), one or more of the shapes may be adjusted as discussed herein. For example, in some embodiments, the first shape is affixed at the first position within a virtual viewpoint of a virtual environment, such that the first shape remains in place (e.g., within the virtual viewpoint of the virtual environment) regardless of movement to the HMD. The first shape may move its position within the virtual environment to remain in place within the virtual viewpoint, for example where the first shape and a virtual camera that captures the virtual viewpoint are moved in parity to maintain the position of the first shape relative to the virtual camera. The second shape (not visible in visualization 806), however, in some embodiments is configured to adjust as the HMD is moved, such that the second shape starting at the first position is rendered and its position is subsequently updated as data resulting from movements to the HMD is received or detected. The visualization 806 may correspond to a first time, for example when a test procedure is initiated, or a particular frame of the test procedure.

The visualization 808 is rendered with respect to a second time, for example after a movement of a particular HMD along the sway test axis. It should be appreciated that the capturing of the visualization 808 may be similar to or the same as described with respect to the visualization 804, however the visualization 808 may be associated with data indicating a different test axis.

In visualization 808, the first shape 806A is at a second position. The first shape 806A remains affixed at the first position within the virtual viewpoint, while the second shape 808B is adjusted and becomes visible from behind the first shape 806A. Reference data associated with the first shape 806A, or the first shape 806A and the second shape 808B, may be recorded at the second time indicating that the second shape 808B is at the second position. The second shape 808B at the second position is at least slightly offset from the first shape 806A at its affixed position, such that at least a portion of the second shape 808B becomes visible. For example, the second shape 808B may have been adjusted in response to one or more movements in the position of the HMD, while the first shape 806A remains affixed in the virtual viewpoint of the virtual environment. In this regard, the second position of the second shape 808B may be an updated position in the virtual viewpoint, whereas the second position of the first shape 806A may be the same first position as that depicted in visualization 806. Such an offset between the first shape 806A and the second shape 808B results in the slight visibility of the second shape 808B, rather than the perfect or near-perfect alignment and lack of visibility of the second shape as depicted in visualization 806 at the starting positions.

In some embodiments, the offset between the first shape 806A and the second shape 808B may be represented by a positional displacement vector or an orientation displacement angle associated with the offset of the shapes. The positional displacement vector may represent a magnitude or direction of an offset between one or more reference points on or otherwise associated with each of the first shape 806A and the second shape 808B. The orientation displacement angle may represent an angle offset between one or more reference points on or otherwise associated with each of the first shape 806A and the second shape 808B with respect to a particular axis, for example a test axis.

Additionally or alternatively, one or more errors associated with the alignment of the first shape 806A and the second shape 808B may be determined, for example based on a generated positional displacement vector or orientation displacement angle. For example, in some embodiments, a positional displacement vector is used to derive a corresponding HMD movement tracking error, or an orientation displacement angle is used to derive a corresponding HMD orientation tracking error. The HMD movement tracking error or the HMD orientation tracking error may be processed to determine a test result for a particular testing procedure at a particular time, for example the second time depicted in the visualization 808.

As illustrated in visualization 808, the test procedure raises a passed test result. In this regard, one or more errors associated with the offsets between the second shape 808B at its updated, second position and the first shape 808A at its position (e.g., the same, affixed position as the starting position) satisfies one or more corresponding thresholds. For example, as illustrated, the positional and angular offsets remain small, such that corresponding HMD movement tracking error or HMD orientation tracking error may similarly be minimal and satisfy many thresholds. In some embodiments, the offset depicted in visualization 808 is less than a threshold that, if not satisfied, indicates the offset may be detectable by a user of the HMD or have a negative impact on the health or experience of a user of the HMD.

FIG. 8 further includes a visualization 810 of the starting positions of a heave axis test procedure, which similarly depicts representations of a first shape 810A and a second shape. The second shape is aligned with the first shape 810A, with the first shape 810A in front (e.g., such that the second shape is not visible to the user as the second shape is blocked by the first shape 810A). Specifically, visualization 810 includes the first shape 810A at a first position, with the second shape depicted behind the first shape 810A at the first position.

FIG. 8 further includes a visualization 812, which is rendered with respect to a second time after a movement of a particular HMD along a heave axis. It should be appreciated that the recording of data associated with the visualization 812 may be similar to or the same as described with respect to the visualization 804 and the visualization 808, however the visualization 812 may be associated with data indicating a different test axis.

In the visualization 812, the second shape 812B is at an updated, second position in the virtual viewpoint. The first shape 810A remains at a first position, such that the second shape 812B becomes visible from behind the first shape 810A. Reference data associated with the first shape 810A, or the first shape 810A and the second shape 812B, may be recorded at the second time indicating that the second shape 812B has moved to the second position. The second shape 812B at the second position is further offset in the virtual viewpoint from the first shape 810A at its fixed position in the virtual viewpoint, such that at least a portion of the second shape 812B becomes visible. For example, the second shape 812B may have been adjusted in response to one or more movements in the position of the HMD, while the first shape 810A remains affixed in the virtual viewpoint of the virtual environment. In this regard, the second position of the second shape 812B may be an updated position within the virtual viewpoint, whereas the second position of the first shape 810A may be the same first position as that depicted in visualization 810. Such an offset between the first shape 810A and the second shape 812B results in an increased visibility of the second shape 812B, rather than the perfect or near-perfect alignment of the shapes depicted in visualization 810 at the starting positions.

As illustrated in visualization 812, the test procedure raises a failed test result. In this regard, the offsets between the first shape 810A at its affixed and the second shape 812B at its second position fails to satisfy one or more corresponding thresholds. For example, as illustrated, the errors derived from the positional and angular offsets do not satisfy one or more corresponding thresholds. For example, as illustrated, the positional and angular offsets are sufficiently large such that corresponding HMD movement tracking error or HMD orientation tracking error exceed or otherwise fail to satisfy one or more thresholds. In some examples, the HMD movement tracking error (e.g., derived from a positional displacement vector representing such an offset) may exceed a threshold that represents an acceptable amount of offset between one or more reference points of the first shape 810A and one or more reference points of the second shape 812B.

In some embodiments, the failed test results is associated with the second time, and one or more other test results may be raised with respect to other times. For example, in some embodiments the test procedure is run for reference data associated with a plurality of times, and a test result is raised for each individual time of the plurality of times. The test procedure for the overall simulation may depend on the test result raised for each individual time, for example where a test procedure raises an overall failure result if sub-test procedures raise a failed test result for a certain number of continuous times, a failed test result is raised for a certain portion of times, or the like. In other embodiments, a test procedure is considered to raise a failed test result where data associated with any time raises a failed test result for any sub-test procedure.

Figure 9:
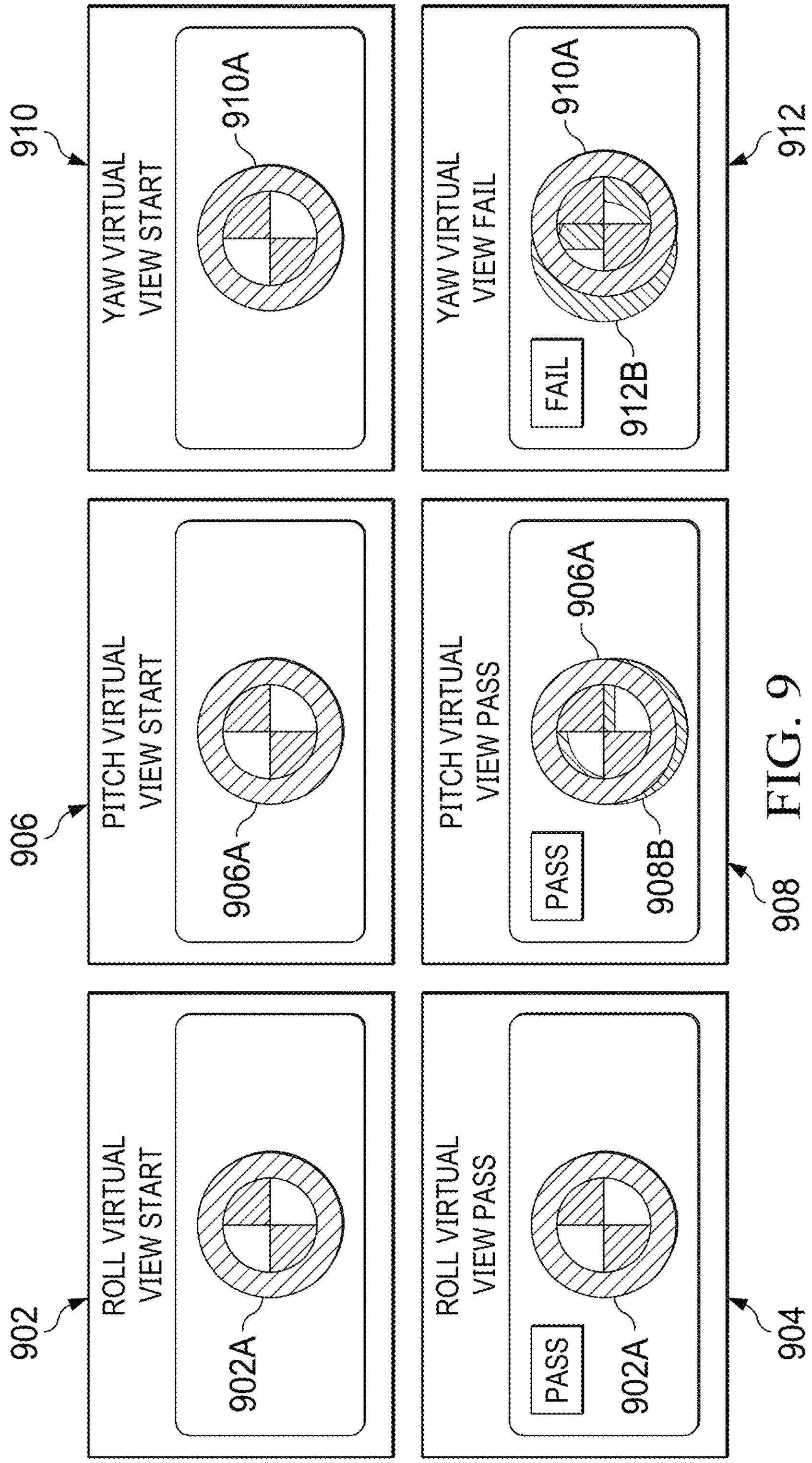
FIG. 9 is a shape diagram illustrating additional example viewpoint compensation tests and tests results in accordance with at least one aspect of the disclosure.

FIG. 9 illustrates a depiction of additional example viewpoint compensation tests and tests results in accordance with at least one aspect of the disclosure. Specifically, FIG. 9 depicts visualizations including renderings of different shapes, including such shapes at starting positions within virtual viewpoints, and such shapes at corresponding positions at a time at which a determination of a test result is performed, for test procedures of additional test axes. Such additional test axes include a roll test axis, a pitch test axis, and a yaw test axis. Such test procedures may be performed after, before, or in conjunction with those discussed above with respect to FIG. 8. In this regard, the depictions and details discussed with respect to FIG. 8 may correspond similarly to the visualizations and related procedures depicted and discussed with respect to FIG. 9, with FIG. 9 corresponding to such differing test axes.

FIG. 9 includes a visualization 902 of starting positions for a roll axis test procedure and a visualization 904 of test positions for the roll axis test procedure. FIG. 9 further includes a visualization 906 of starting positions for a pitch axis test procedure and a visualization 908 of test positions for the pitch axis test procedure. FIG. 9 further includes a visualization 910 of starting positions for a yaw axis test procedure and a visualization 912 of test positions for the yaw axis test procedure. Test results may be determined or otherwise generated based on the data represented in such visualizations for each of the corresponding test axes, for example where a test result is determined corresponding to the roll test axis, the pitch test axis, and the yaw test axis respectively. Each of the visualizations may represent a portion of a virtual viewpoint of a virtual environment, for example within which a first shape and a second shape are rendered in response to input or output data controlling adjustment of the virtual viewpoint or one or more elements rendered therein.

As described with respect to FIG. 8, in some embodiments, the test procedures are performed over a time series. For example, reference data for each shape may include positions of reference points at various different times, including a starting time and a time at which a test procedure is triggered. In some embodiments, a passing test result is determined in circumstances where the one or more errors derived from reference data associated with a first shape and a second shape are within one or more corresponding thresholds, or a failed test result is determined in circumstances where errors derived from reference data associated with a first shape and a second shape are not within the corresponding thresholds at one time or at a particular number, percentage, or portion of times in a time series, as described herein.

In visualization 902, a first shape 902A is at a first (e.g., starting) position within the virtual viewpoint. A second shape is aligned with the fist shape, such that the second shape is rendered under (or "behind") the first shape 902A and thus is not visible due to being blocked by the rendering of the first shape 902A. In this regard, the visualization 902 depicts a perfect, or near-perfect, alignment between at least one position of at least one reference point of the first shape 902A and at least one position of at least one corresponding reference point of the second shape. In some embodiments, the reference point of each shape matches for comparison, for example the reference point is a center point of each shape, a corner point of a cutout portion of the shape, or the like.

As the HMD is moved (e.g., via a movement of a test stand to which the HMD is secured), one or more of the shapes may be adjusted as discussed herein. For example, in some embodiments, the first shape 902A at the first position within a virtual viewpoint of a virtual environment is affixed, such that the first shape 902A remains in place regardless of movement to the HMD. The second shape, however, in some embodiments is configured to adjust as the HMD is moved, such that the second shape at the first position is subsequently updated within the virtual viewpoint as data resulting from movements to the HMD is received or detected. The visualization 902 may correspond to the first time, for example when a test procedure is initiated, or a particular frame of the test procedure. The visualization 904 is rendered with respect to a second time, for example after a movement of a particular HMD along the roll test axis. It should be appreciated that the capturing of the visualization 902 may be similar to or the same as described with respect to the visualization 802, however the visualization 902 may be associated with data indicating a different test axis.

In visualization 904, the first shape 902A is depicted at a second position after the movement, where the second position is unmoved from the first position due to the first shape 902A being affixed within the virtual viewpoint. The second shape similarly is at a second position, and remains aligned with the first shape 902A. In this regard, the updated position of the second shape is at or significantly close to the affixed position of the first shape 902A. In this regard, the second shape remains not visible in the visualization 904, as it is blocked by the first shape 902A at the second position.

Reference data associated with the second shape at one or more positions may be recorded, and reference data associated with the first shape at one or more positions may similarly be recorded. In some embodiments, the reference data includes center point positions for each of the first shape and the second shape. Additionally, in some embodiments, positions of a different reference point of the first shape and the second shape may be utilized. In some embodiments, the reference data for the first and second shape may be used to generate a positional displacement vector or an orientation displacement angle at a given time. For example, the positional displacement vector or orientation displacement angle may be generated by at least comparing the reference data of the first shape with the reference data of the second shape for a given time. In some embodiments, the positional displacement vector includes data indicating an offset between the position of a reference point of the first shape with a position of a corresponding reference point on the second shape, such as by comparing the position of the first shape (e.g., the affixed position in the virtual viewpoint) and the position of the second shape (e.g., the second position in the virtual viewpoint to which the second shape is adjusted) in the reference data. Additionally or alternatively, the orientation displacement angle in some embodiments includes data indicating an angle offset between the position of the first shape and the position of the second shape, for example with respect to a test axis. In this regard, the orientation displacement angle is generated, from the reference data, by comparing at least a position of at least one reference point associated with each shape to determine an offset in the orientation (e.g., a rotation) of the first shape 902A to the orientation of the second shape, for example with respect to the test axis.

In some embodiments, the offset between a first shape and a second shape may be represented by a positional displacement vector or an orientation displacement angle associated with the first shape and second shape. Additionally or alternatively, one or more errors associated with the offset in the alignment of the first shape and the second shape may be determined, for example based on a generated positional displacement vector or orientation displacement angle. For example, in some embodiments, a positional displacement vector is used to derive a corresponding HMD movement tracking error, or an orientation displacement angle is used to derive a corresponding HMD orientation tracking error. The HMD moving tracking error or the HMD orientation tracking error may be processed to determine a test result for a particular testing procedure at a particular time, for example the second time depicted in the visualization 904.

As illustrated in visualization 904, the test procedure raises a passed test result. In this regard, one or more errors associated with the offsets between the first shape 904A at its affixed position and the second shape positioned behind the first shape 904A at its updated, second position (e.g., which similarly may be unchanged or near-unchanged) satisfies one or more corresponding thresholds. For example, as illustrated the positional and angular offsets between the first shape 904A and the second shape are zero or near-zero, such that corresponding HMD movement tracking error or HMD orientation tracking error may similarly be minimal and satisfy many thresholds.

As illustrated, FIG. 9 includes a visualization 906 of the starting positions for a pitch axis test procedure, which similarly depicts representations of a first shape and a second shape. The second shape aligned with the first shape 906A (e.g., such that the second shape is not visible to the user as the second shape is blocked by the first shape 906A). Specifically, visualization 906 includes the first shape 906A at a first position, with the second shape depicted behind the first shape 906A at the same first position.

As the HMD is moved (e.g., via a movement of a test stand to which the HMD is secured), one or more of the shapes may be adjusted as discussed herein. For example, in some embodiments, the first shape 906A is affixed at the first position within a virtual viewpoint of a virtual environment, such that the first shape 906A remains in place regardless of movement to the HMD. The second shape, however, in some embodiments is configured to adjust as the HMD is moved, such that the second shape at the first position is rendered and its position is subsequently updated within the virtual viewpoint as data resulting from movements to the HMD is received or detected. The visualization 906 may correspond to a first time, for example when a test procedure is initiated, or a particular frame of the test procedure.

The visualization 908 is rendered with respect to a second time, for example after a movement of a particular HMD along the pitch test axis. It should be appreciated that the capturing of the visualization 908 may be similar to or the same as described with respect to the visualization 904, however the visualization 908 may be associated with data indicating a different test axis.

In visualization 908, the first shape 906A is at its affixed position within the virtual viewpoint. The second shape 908B is at its second, updated position, such that the second shape 908B becomes visible from behind the first shape 906A. Reference data associated with the first shape 906A, or the first shape 906A and the second shape 908B, may be recorded at the second time indicating that the second shape 908B is at the second position. The second shape 908B at the second position is at least slightly offset from the first shape 906A at its affixed position (e.g., a second position that is the same as its first position), such that at least a portion of the second shape becomes visible. For example, the second shape 908B may have been adjusted in response to one or more movements in the position of the HMD, while the first shape 906A remains affixed in the virtual viewpoint of the virtual environment. In this regard, the second position of the second shape 908B may be an updated position within the virtual viewpoint, whereas the second position of the first shape 906B may be the same first position as that depicted in visualization 906. Such an offset between the first shape 906A and the second shape 908B results in slight visibility of the second shape 908B, rather than the perfect or near-perfect alignment depicted in visualization 906 at the starting positions.

In some embodiments, the offset between the first shape 906A and the second shape 908B may be represented by a positional displacement vector or an orientation displacement angle associated with the offset of the shapes. Additionally or alternatively, one or more errors associated with the alignment of the first shape 906A and the second shape 908B may be determined, for example based on a generated positional displacement vector or orientation displacement angle. For example, in some embodiments, a positional displacement vector is used to derive a corresponding HMD movement tracking error, or an orientation displacement angle is used to derive a corresponding HMD orientation tracking error. The HMD movement tracking error or the HMD orientation tracking error may be processed to determine a test result for a particular testing procedure at a particular time, for example the second time depicted in the visualization 908.

As illustrated in visualization 908, the test procedure raises a passed test result. In this regard, one or more errors associated with the offsets between the second shape 908B at its updated, second position within the virtual viewpoint and the first shape 906A at its affixed position (e.g., the same first position as the starting position) satisfies one or more corresponding thresholds. For example, as illustrated, the positional and angular offsets remain small, such that corresponding HMD movement tracking error or HMD orientation tracking error may similarly be minimal and satisfy many thresholds. In some embodiments, the offset depicted in visualization 908 is less than a threshold that, if not satisfied, indicates the offset may be detectable by a user of the HMD or have a negative impact on the health or experience of a user of the HMD.

FIG. 9 further includes a visualization 910 of the starting positions of a yaw axis test procedure, which similarly depicts representations of a first shape 910A and a second shape. The second shape aligned with the first shape 910A (e.g., such that the second shape is not visible to the user as the second shape is blocked by the first shape 910A). Specifically, visualization 910 includes the first shape 910A at a first position, with the second shape depicted behind the first shape 910A at the first position.

FIG. 9 further includes a visualization 912, which is rendered with respect to a second time after a movement of a particular HMD along a yaw axis. It should be appreciated that the capturing of the visualization 912 may be similar to or the same as described with respect to the visualization 904 and the visualization 908, however the visualization 912 may be associated with data indicating a different test axis.

In the visualization 912, the second shape 912B is at an updated, second position within the virtual viewpoint. The first shape 910A remains at a first position, such that the second shape 912B becomes visible from behind the first shape 910A. Reference data associated with the first shape 910A, or the first shape 910A and the second shape 912B, may be recorded at the second time indicating that the second shape 912B has moved to the second position within the virtual viewpoint. The second shape 912B at the second position is further offset from the first shape 910A at its affixed position, such that at least a portion of the second shape 912B becomes visible. For example, the second shape 912B may have been adjusted in response to one or more movements in the position of the HMD, while the first shape 910A remains affixed in the virtual viewpoint of the virtual environment. In this regard, the second position of the first shape 910A may be the same first position as that depicted in visualization 910. Such an offset between the first shape 910A and the second shape 912B results in an increased visibility of the second shape 912B, rather than the perfect or near-perfect alignment depicted in visualization 910 at the starting positions.

As illustrated in visualization 912, the test procedure raises a failed test result. In this regard, the offsets between the first shape 910A at its affixed position within the virtual viewpoint and the second shape 912B at its second position fails to satisfy one or more corresponding thresholds. For example, as illustrated, the errors derived from the positional and angular offsets do not satisfy one or more corresponding thresholds. For example, as illustrated, the positional and angular offsets are sufficiently large such that corresponding HMD movement tracking error or HMD orientation tracking error exceed or otherwise fail to satisfy one or more thresholds. In some examples, the HMD movement tracking error (e.g., derived from a positional displacement vector representing such an offset) may exceed a threshold that represents an acceptable amount of offset between one or more reference points of the first shape 910A and one or more reference points of the second shape 912B.

In some embodiments, the failed test result is associated with the second time, and one or more other test results may be raised with respect to other times. For example, in some embodiments the test procedure is run for reference data associated with a plurality of times, and a test result is raised for each individual time of the plurality of times. The test procedure for the overall simulation may depend on the test result raised for each individual time, for example where a test procedure raises an overall failure result if sub-test procedures raise a failed test result for a certain number of continuous times, a failed test result is raised for a certain portion of times, or the like. In other embodiments, a test procedure is considered to raise a failed test result where data associated with any time raises a failed test result for any sub-test procedure.

In some embodiments, a test result raised for a particular test axis is output via one or more displays. For example, in some embodiments the test result is output to the display of a HMD. Additionally or alternatively, in some embodiments, the test result is output to a separate display, for example a first additional display associated with a simulation instructor, or a second additional display associated with an operator of a simulation (e.g., a simulation student). In some embodiments, an error message is output when a failed test result.

Example Processes of the Disclosure

Some embodiments are configured to perform one or more processes for measuring viewpoint compensation for movement of a head mounted display. For example, in some embodiments, the processes define test procedures for measuring viewpoint compensation, or determining test results for such test procedures based on measured values associated with viewpoint compensation. Flowcharts are provided herein that define such processes.

In some embodiments, the processes discussed herein define a computer-implemented method. For example, the computer-implemented method may be executed utilizing one or more computing elements, for example where the computer-implemented method is executed by at least one processor. In some embodiments, at least one of the processes discussed herein is performed by an apparatus or device, for example an apparatus embodying a simulation host system, image generation system, or head mounted device as depicted and described herein. For example, in some embodiments, at least one of the processes discussed herein is performed by an apparatus including at least one non-transitory memory and at least one processor that executes computer instructions stored on the at least one memory to cause the apparatus to perform the at least one process. In some embodiments, at least one non-transitory computer-readable medium stores computer instructions stored thereon that, in execution with at least one processor, is configured to perform at least one of the processes discussed herein.

The processes discussed herein include operational blocks defining each step of the flowchart. It should be appreciated that the depicted flow represents an example order of the steps in the flow. In other embodiments, one or more operational blocks may come before or after one of the other operational blocks as depicted, such that the order of the steps performed differs from that depicted. In this regard, it will be appreciated that different embodiments may perform the steps depicted in the operational blocks of the flowcharts in one or more alternative order without deviating from the scope and spirit of this disclosure and the following claims.

Optional operational blocks are depicted in dashed (or "broken") lines. In some embodiments, at least one of the optional operational blocks is performed. In some embodiments, all of the optional operational blocks are performed.

In other embodiments, at least one of the operational blocks is not performed. In this regard, it should be appreciated that different embodiments as discussed herein may include different optional operations corresponding to the operational blocks depicted and described herein.

Figure 10:
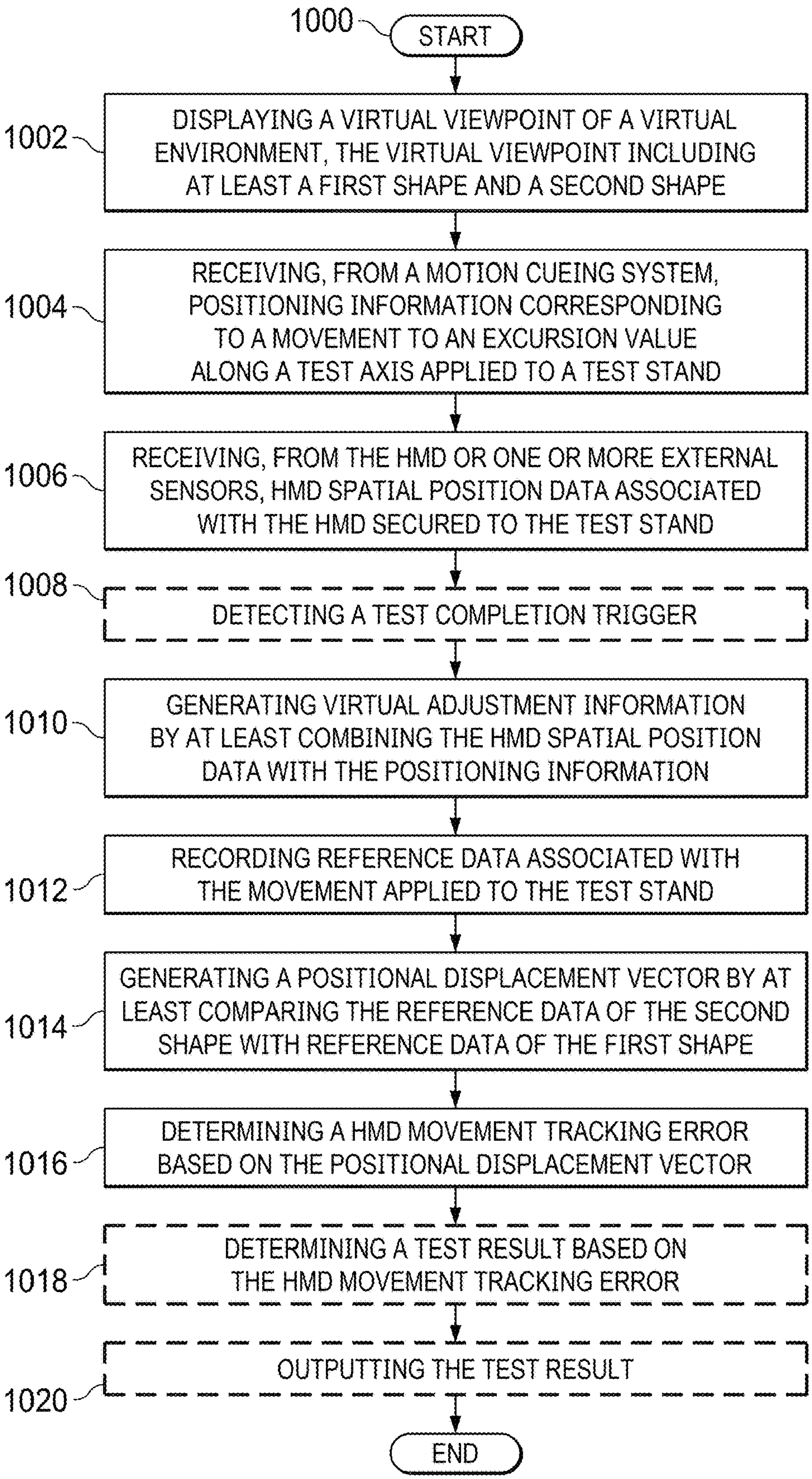
FIG. 10 is a flow diagram illustrating an example process for performing at least one test of HMD viewpoint compensation in accordance with at least one aspect of the disclosure.

FIG. 10 illustrates a flowchart depicting operations of an example process for performing at least one test of HMD viewpoint compensation in accordance with at least one aspect of the disclosure.

Specifically, FIG. 10 depicts an example process 1000. In some embodiments, the process 1000 is performed by a simulation host system or an image generation system in communication with a head mounted device. For example, in some embodiments the process 1000 is performed by such devices alone, or in conjunction with one another, as depicted and described with respect to FIG. 1.

At operation 1002, the process 1000 includes displaying a virtual viewpoint of a virtual environment. The virtual environment includes at least a first shape and a second shape, and the virtual viewpoint is similarly displayed including the first shape and the second shape. In some embodiments, the first shape is optionally in front of the second shape in the virtual viewpoint. The second shape adjusts in the virtual viewpoint as the virtual viewpoint adjusts, for example in response to movement of a HMD as depicted and described herein. In some embodiments, the second shape is positioned behind the first shape, and the first shape is affixed in the virtual viewpoint of the virtual environment. In this regard, the position of the first shape remains the same even as the virtual viewpoint associated with the virtual environment is adjusted. In some embodiments, the second shape may be revealed through movement of the HMD resulting in adjustment to the position of the second shape in the virtual viewpoint of the virtual environment. In this regard, the virtual viewpoint may be updated to reflect movements affecting the HMD, with the first shape remaining affixed with respect to the virtual viewpoint regardless of such adjustments and the second shape being adjusted within the virtual viewpoint without adjusting the position of the first shape within the virtual viewpoint. In some such embodiments, the position of the first shape is similarly adjusted to mirror adjustments to the virtual viewpoint, such that the first shape maintains its affixed position in the virtual viewpoint. In some embodiments, the process 1000 includes causing outputting of the virtual environment to the HMD, for example to cause the HMD to render a virtual viewpoint of the virtual environment to at least one display of the HMD.

Additionally, in some embodiments, the virtual viewpoint of the virtual environment is configured to adjust in response to movement of a HMD secured to a test stand. For example, in some embodiments the virtual viewpoint corresponds to a captured representation of a virtual camera positioned within the virtual environment. The virtual camera is intended to function as a view of a user, where movements of the virtual camera mirror movements of the HMD via the test stand as a proxy for head mounted control of a user's view in the virtual environment. The test stand may be locked from movement.

At operation 1004, the process 1000 includes receiving, from a motion cueing system, positioning information corresponding to at least one movement applied to a test stand. In some embodiments, the motion cueing system continuously captures, generates, monitors, or sends the positioning information, such that positioning information is received for a plurality of times in a time series. In some embodiments, the positioning information represents the impulses, controls, or performed actions representing the at least one movement applied to the test stand performed by the motion cueing system. For example, in some embodiments the positioning information indicates at least a position to which the motion cueing system associated with the test stand was moved, or at least a position from which the motion cueing system associated with the test stand started a movement. In this regard, due to the HMD being secured to the test stand, the positioning information further represents a movement of the HMD along the test axis (e.g., a translation or rotation of the HMD based on movement applied to the test stand to which the HMD is secured). In some embodiments, the at least one movement includes a movement of the motion cueing system and applied to the test stand to an excursion value along a test axis, for example where the excursion value represents a new position to which the motion cueing system is to be moved via rotation, translation, or the like. The excursion value may be a maximum excursion value representing a maximum point along the test axis to which a movement may be performed, or in some embodiments may be any other point along the test axis to which the movement may be performed. Additionally or alternatively, in some embodiments, the at least one movement includes a movement from the excursion value to another position (e.g., a neutral position) along the test axis. For example, in some embodiments, the neutral position represents a default or starting position of the motion cueing system associated with the test stand, such that the at least one movement includes data corresponding to a movement to a particular excursion value from such a default position or movement from the particular excursion value back to the default position. In some embodiments, the test stand is locked for movement in all degrees of freedom, such that the entirety of the test stand moves in conjunction with the motion cueing system when the motion cueing system applies a movement to the test stand.

At operation 1006, the process 1000 includes receiving, from the HMD or one or more external sensors, HMD spatial position data associated with the HMD secured to the test stand. In some embodiments, the sensors of the HMD are utilized to receive continuous HMD spatial position data associated with the HMD, for example where the HMD spatial position data is received for multiple times in a time series. In some embodiments, the HMD spatial position data includes or embodies sensor data or other data indicating a change of position of the HMD, for example a translation or rotation. The change in position may correspond to an initiated movement applied to the test stand, for example via a motion cueing system. In some embodiments, the HMD spatial position data is received from one or more sensors onboard the HMD itself. In some embodiments, at least some of the HMD spatial position data is received from one or more other sensors external to the HMD and associated with monitoring the HMD.

At operation 1008, the process 1000 optionally includes detecting a test completion trigger. The test completion trigger indicates a request to begin determination of a test result. In some embodiments, the test completion trigger includes a gesture, control input, or other specially-defined user interaction. For example, in some embodiments a user interacts with a user interface control or peripheral to provide input embodying the test completion trigger, for example at a time where a user initiates the process for determining at least one test result at or near completion of a movement applied to the test stand to which the HMD is secured. In some embodiments, the test completion trigger is detected as a result of a software or data-driven determination. For example, in some embodiments, the test completion trigger is detected in response to a timer controlling a rate at which test results are determined during a test procedure. In other embodiments, a different check is performed that, when satisfied, indicates detection of a test completion trigger. In some embodiments, the test completion trigger is detectable at any point along the movement of the HMD, or is triggered at multiple points along the movement.

At operation 1010, the process 1000 includes generating virtual adjustment information. In some embodiments, the virtual adjustment information is generated by at least combining the HMD spatial position data with the positioning information. The virtual adjustment information indicates adjustments to be made to a virtual viewpoint, or a particular shape in the virtual viewpoint of the virtual environment, for example where the shape is configured to be adjustable within virtual viewpoint of the virtual environment. In one example context, the virtual adjustment information represents a detected change in the position of the HMD represented by the HMD spatial position data, offset by a position change triggered via the motion cueing system and represented by the positioning information. In some embodiments, the virtual adjustment information that is generated is applied to the virtual viewpoint. In this regard, the virtual viewpoint of the virtual environment may be rendered at a particular position that is based at least in part on the position adjustments represented in the virtual adjustment information.

At operation 1012, the process 1000 includes recording reference data associated with the movement applied to the test stand. The reference data may include one or more data values or portions of data associated with a reference position of a first shape or a reference position of a second shape, or both shapes. In some embodiments, the reference data indicates at least a reference position of the second shape, for example a position of at least one reference position within the virtual environment or the virtual viewpoint of the virtual environment. In some embodiments, the reference data indicates at least a reference position of the first shape, for example a position of at least one reference position within the virtual environment or the virtual viewpoint of the virtual environment. In some embodiments, the reference position includes a position of a center point of a corresponding shape, a corner point of a cutout portion of the corresponding shape, a top point of the corresponding shape, a left point of the corresponding shape, a right point of the corresponding shape, a bottom point of the corresponding shape, or any other determined point of or otherwise associated with the corresponding shape. The reference data may include reference positions corresponding to the reference points as the second shape is adjusted throughout movement of the HMD resulting from initiated movement applied to the test stand. In this regard, a portion of the reference data may be associated with a particular value at which a test stand is along the test axis throughout the movement, or a particular timestamp during the movement, at which the portion of reference data is collected. It should be appreciated that the reference data may include multiple portions associated with different values along the test axis, or different timestamps, or both.

At operation 1014, the process 1000 includes generating a positional displacement vector. The positional displacement vector represents an offset in a position of a first shape and a second shape in the virtual environment, such as based on coordinates representing positions of the at least one reference point. For example, in some embodiments, the positional displacement vector is generated by at least comparing the reference data of the second shape with reference data of the first shape. In some embodiments, the reference data for the second shape is predetermined or otherwise static, for example due to the second shape being at an affixed position within the virtual environment. The reference data for each shape may include positions of the same type of reference point, such that the positions of a particular reference point may be compared to determine an offset associated with the reference point.

In some embodiments, the positional displacement vector is one of a plurality of positional displacement vectors. For example, in some embodiments, the plurality of positional displacement vectors represents a series of positional displacement vectors associated with a plurality of times in a time series. Each time may correspond to a different position during a movement of the motion cueing system and applied to a test stand to or from an excursion value. In this regard, each positional displacement vector of the plurality of positional displacement vectors may be processed for a particular time, as discussed herein.

At operation 1016, the process 1000 includes determining a HMD movement tracking error. In some embodiments, the HMD movement tracking error is determined based on the positional displacement vector generated for the first shape and the second shape. In some embodiments, the HMD movement tracking error represents a magnitude of the offset as represented by the positional displacement vector. In some embodiments, any other error determination formula may be used to determine the HMD movement tracking error from the positional displacement vector.

At operation 1018, the process 1000 optionally includes determining a test result. The test result may be one of a test passed result or a test failed result. In some embodiments, the test result is determined based on the HMD movement tracking error. For example, in some embodiments, the test result is determined by comparing the HMD movement tracking error with at least one threshold. In some such embodiments, the test result is determined to be the test passed result in a circumstance where the HMD movement tracking error does not exceed (or otherwise satisfies) the threshold. The test result is determined to be a test failed result in a circumstance where the HMD movement tracking error exceeds (or otherwise does not satisfy) the threshold. The threshold may be set by a user, automatically determined, predetermined, or otherwise set using an automatic or manual mechanism. In some embodiments, a threshold corresponding to a HMD movement tracking error is set to a particular distance, for example 2 inch (or any other measurement, such as 1 inch, 1.5 inch, or the like), that is determined a sufficient offset to not negatively impact a user. In some embodiments, a threshold corresponding to a HMD orientation tracking error is set to a particular angle, for example 5 degrees (or any other angle, such as 4 degrees, 3 degrees, or the like), that is determined a sufficient rotation to not negatively impact a user.

Additionally or alternatively, in some embodiments, the test result is determined based on data associated with multiple times of a time series. For example, in some embodiments, multiple HMD movement tracking errors are determined based on multiple reference data portions corresponding to multiple times of a time series. A sub-test result may be determined for each time of the time series. The test result for the process 1000 may then be determined based on the combination of the sub-test results. The test result may be determined based on whether a particular number, particular percentage, or particular number of times are associated with a test failed result. For example, in some circumstances the test failed result is determined in a circumstance where, for a continuous number of times or times within a particular range of time series, the particular number, particular percentage, or particular number of times are associated with a test failed result.

At operation 1020, the process 1000 optionally includes outputting the test result. In some embodiments, the test result is output to at least one display by rendering a label, image, or other visual data that is configured based on the test result. For example, in some embodiments, the test result is output in a first color, first text label (e.g., a “pass” label), first image (e.g., a checkmark indicating a passed test result), or the like in a circumstance where the test result includes a test passed result. The test results is output in a second color, second text label (e.g., a “fail” label), a second image (e.g., an X indicating a failed test result), or the like in a circumstance where the test result includes a test failed result. In some embodiments, the process 1000 determines sub-test results for various times of a time series, and only outputs a test result for a particular time (e.g., upon a determining a failed test result when a threshold number of continuous times are associated with a failed test result). In some embodiments, the test result is output via rendering within the virtual viewpoint of the virtual environment. In some embodiments, the test result is output to multiple displays, as discussed further herein.

In some embodiments, the process 1000 may be repeated for any number of additional test axes. For example, in some embodiments, for at least one additional test axis, the operations 1002 through 1020 may be repeated. In this regard, additional positioning information corresponding to an additional movement of the motion cueing system and applied to the test stand to an additional excursion value along the additional test axis may be received from the motion cueing system. Additional HMD spatial position data associated with the HMD on the test stand may be received from the HMD. Additional virtual adjustment information may be generated by at least combining the HMD spatial position data with the positioning information, where the virtual viewpoint and the second shape are adjusted based on the virtual adjustment information. Additional reference data of the second shape indicating at least the reference position of the second shape may be recorded. An additional positional displacement vector may be generated by at least comparing the additional reference data of the second shape with additional reference data of the first shape. An additional HMD movement tracking error based on the positional displacement vector, where the additional HMD movement tracking error is associated with the additional test axis. Additionally or alternatively, in some embodiments, an additional test completion trigger may be detected. An additional test result (e.g., corresponding to the additional test axis) may be determined based on the additional HMD movement tracking error. The additional test result may then be outputted. Each of these steps may be performed in a manner similar to that discussed with respect to the steps of the process 1000, with the difference being that each data portion is associated with a different, additional test axis being tested.

Figure 11:
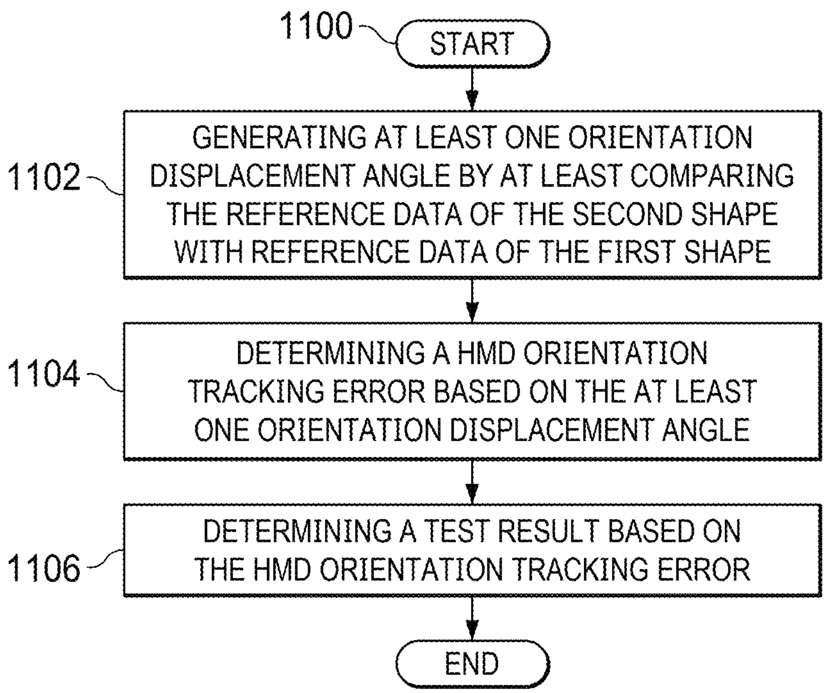
FIG. 11 is a flow diagram illustrating an example process for determining a HMD orientation tracking error, for example as part of an example process for performing at least one test of HMD viewpoint compensation, in accordance with at least one aspect of the disclosure.

FIG. 11 illustrates a flowchart depicting operations of an example process for determining a HMD orientation tracking error, for example as part of an example process for performing at least one test of HMD viewpoint compensation, in accordance with at least one aspect of the disclosure. Specifically, FIG. 11 depicts an example process 1100. In some embodiments, the process 1100 is performed by a simulation host system or an image generation system in communication with a head mounted device. For example, in some embodiments the process 1100 is performed by such devices alone, or in conjunction with one another, as depicted and described with respect to FIG. 1. In some embodiments, the process 1100 is performed in addition to, as part of, or in place of one or more operational blocks of the process 1000 as depicted and described in FIG. 10. For example, in some embodiments, the process 1100 is performed in addition to or as an alternative of the operation 1014 as depicted and described with respect to FIG. 10.

At operation 1102, the process 1100 includes generating at least one orientation displacement angle. The orientation displacement angle represents a rotation angle between a position of a first shape and a second shape in the virtual environment, such as based on coordinates representing positions of the at least one reference point. For example, in some embodiments, the orientation displacement angle is generated by at least comparing the reference data of the second shape with reference data of the first shape. In this regard, the reference data for each shape may include positions of the same type of reference point, such that the positions of a particular reference point may be compared to determine an angle of rotation between the positions associated with the reference point.

In some embodiments, the orientation displacement angle is one of a plurality of orientation displacement angles. For example, in some embodiments, the plurality of orientation displacement angles represent a series of orientation displacement angles associated with a plurality of times in a time series. Each time may correspond to a different position during a movement of the motion cueing system and applied to a test stand to or from an excursion value. In this regard, each orientation displacement angle of the plurality of orientation displacement angles may be processed for a particular time, as discussed herein.

At operation 1104, the process 1100 includes determining a HMD orientation tracking error. In some embodiments, the HMD orientation tracking error is determined based on the at least one orientation displacement angle generated for the first shape and the second shape. In some embodiments, the HMD orientation tracking error represents a magnitude of the rotational angle as represented by the orientation displacement angle, for example in comparison to a test axis. In some embodiments, any other error determination formula may be used to determine the HMD orientation tracking error from the orientation displacement angle.

At operation 1106, the process 1100 includes determining a test result. The test result may be one of a test passed result or a test failed result. In some embodiments, the test result is determined based on the HMD orientation tracking error. For example, in some embodiments, the test result is determined by comparing the HMD orientation tracking error with at least one threshold. In some such embodiments, the test result is determined to be the test passed result in a circumstance where the HMD orientation tracking error does not exceed (or otherwise satisfies) the threshold. The test result is determined to be a test failed result in a circumstance where the HMD movement tracking error exceeds (or otherwise does not satisfy) the threshold. The threshold may be set by a user, automatically determined, predetermined, or otherwise set using an automatic or manual mechanism.

Additionally or alternatively, in some embodiments, the test result is determined based on data associated with multiple times of a time series. For example, in some embodiments, multiple HMD orientation tracking errors are determined based on multiple reference data portions corresponding to multiple times of a time series. A sub-test result may be determined for each time of the time series. The test result for the process 1100 may then be determined based on the combination of the sub-test results. The test result may be determined based on whether a particular number, particular percentage, or particular number of times are associated with a test failed result. For example, in some circumstances the test failed result is determined in a circumstance where, for a continuous number of times or times within a particular range of time series, the particular number, particular percentage, or particular number of times are associated with a test failed result.

In some embodiments, the test result is output. For example in some embodiments, the test result is output via rendering to one or more displays, as discussed herein. In some embodiments, the test result is output as depicted and described with respect to operation 1020 in FIG. 10.

Figure 12:
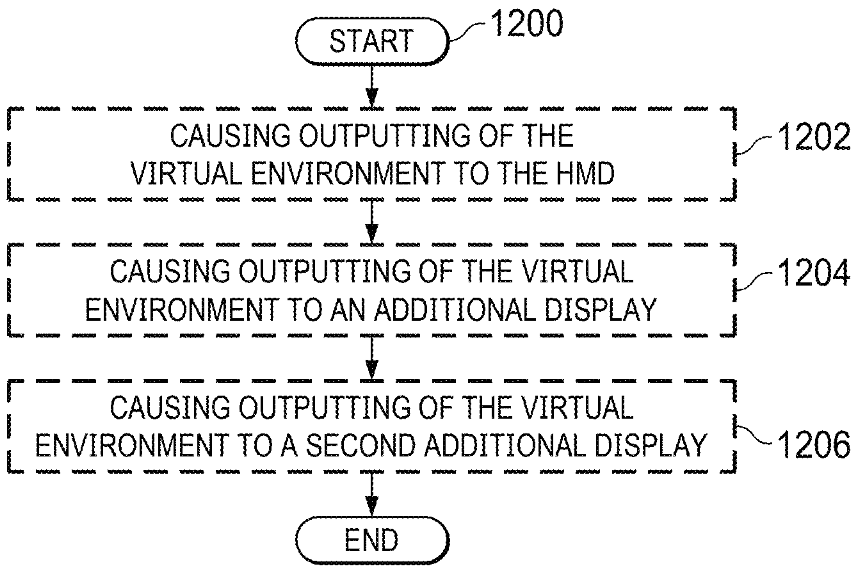
FIG. 12 is a flow diagram illustrating an example process for outputting a virtual environment to at least one display, for example as part of an example process for performing at least one test of HMD viewpoint compensation, in accordance with at least one aspect of the disclosure.

FIG. 12 illustrates a flowchart depicting operations of an example process for outputting a virtual environment to at least one display, for example as part of an example process for performing at least one test of HMD viewpoint compensation, in accordance with at least one aspect of the disclosure. Specifically, FIG. 12 depicts an example process 1200. In some embodiments, the process 1200 is performed by a simulation host system or an image generation system in communication with a head mounted device. For example, in some embodiments the process 1200 is performed by such devices alone, or in conjunction with one another, as depicted and described with respect to FIG. 1. In some embodiments, the process 1200 is performed as part of or in place of one or more operational blocks of the process 1000 as depicted and described in FIG. 10. For example, in some embodiments, the process 1200 is performed in place of the operation 1020 as depicted and described with respect to FIG. 10.

It should be appreciated that each of the operational blocks depicted and described with respect to FIG. 12 is optional. In this regard, any number of the operational blocks may be performed. For example, in some embodiments, only one of the blocks is performed as part of the process 1200. In other embodiments, all or any sub-combinations of the operational blocks may be performed as part of the process 1200.

At operation 1202, the process 1200 includes causing outputting of the virtual environment to the HMD. In this regard, a wearer of the HMD may view a particular virtual viewpoint of the virtual environment. In some embodiments, the virtual environment is rendered together with a test result, such that the shapes and associated test result is rendered within the virtual viewpoint of the virtual environment. The wearer of the HMD may be an operator of the simulation, or during a testing phase may not be utilized as the HMD is secured to the test stand.

At operation 1204, the process 1200 includes causing outputting of the virtual environment to an additional display. Additionally or alternatively, in some embodiments, the virtual environment is output to a display of a secondary system (e.g., a repeater system), such as a system separate from the HMD that similarly outputs at least the virtual viewpoint of the virtual environment. In some embodiments, the virtual environment is rendered together with a test result, such that the shapes and associated test result is rendered within the virtual viewpoint of the virtual environment. In this regard, a second user (e.g., a student of the simulation embodied in the virtual environment) may view the test result together with a rendering of the virtual viewpoint of the virtual environment.

At operation 1206, the process 1200 includes causing outputting of the virtual environment to a second additional display. In some embodiments, the test result is output to a display of a tertiary system (e.g., an instructor system), such as a system separate from the HMD and the secondary system and that similarly outputs at least the virtual viewpoint of the virtual environment. In some embodiments, the virtual environment is rendered together with a test result, such that the shapes and associated test result is rendered within the virtual viewpoint of the virtual environment. In this regard, a third user (e.g., an instructor of the simulation embodied in the virtual environment) may view the test result together with a rendering of the virtual viewpoint of the virtual environment.

In some embodiments, each display receives the same virtual viewpoint of the virtual environment for rendering, such that the displays depict the same visual elements. Each of the different systems having a display to output may have different control or ability to interact with the virtual environment. For example, some systems may have no control and merely receive and display data for output via rendering, and other systems (e.g., the HMD or optionally an instructor system as an additional display) may include one or more controls for interacting with the virtual environment.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a virtual environment configuration unit/module, a sensor device monitoring unit/module, a motion cue monitoring unit/module, a HMD monitoring unit/module, a virtual element updating unit/module, an error determination unit/module, or a test result determination unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:

displaying a virtual viewpoint of a virtual environment, the virtual viewpoint comprising at least a first shape and a second shape, the second shape adjusts in the virtual viewpoint as the virtual viewpoint adjusts, the first shape is affixed in the virtual viewpoint of the virtual environment, and the virtual viewpoint of the virtual environment adjusts in response to movement of a head mounted display (HMD) secured to a test stand;

receiving, from a motion cueing system, positioning information corresponding to a movement to an excursion value along a test axis applied to the test stand;

receiving, from the HMD or one or more external sensors, HMD spatial position data associated with the HMD secured to the test stand;

generating virtual adjustment information by at least combining the HMD spatial position data with the positioning information, wherein the virtual viewpoint and the second shape are adjusted based on the virtual adjustment information;

recording reference data associated with the movement applied to the test stand;

generating a positional displacement vector by at least comparing the reference data of the second shape with reference data of the first shape;

determining a HMD movement tracking error according to the positional displacement vector; and determining a test result according to the HMD movement tracking error.

2. The method according to claim 1, further comprising: outputting the test result.

3. The method according to claim 2, wherein determining the test result according to the HMD movement tracking error comprises:

determining that the HMD movement tracking error is within a threshold, wherein the test result is a test passed result.

4. The method according to claim 3, wherein the threshold comprises about 2 inches.

5. The method according to claim 2, further comprising: detecting a test completion trigger, wherein determining the test result is in response to the detecting of the test completion trigger.

6. The method according to claim 1, further comprising: generating at least one orientation displacement angle by at least comparing the reference data of the second shape with reference data of the first shape; and determining a HMD orientation tracking error according to the at least one orientation displacement angle.

7. The method according to claim 6, further comprising: determining a test result according to the HMD orientation tracking error; and outputting the test result.

8. The method according to claim 7, further comprising: determining that the HMD orientation tracking error is within a threshold, wherein the test result is a test passed result.

9. The method according to claim 8, wherein the threshold comprises about 5 degrees.

10. The method according to claim 1, further comprising: generating the virtual environment comprising a third shape that blocks at least a portion of the virtual environment from rendering in the virtual viewpoint.

11. The method according to claim 1, further comprising: causing outputting of the virtual environment to an additional display or a second additional display.

12. The method according to claim 1, wherein the first shape comprises a first circular shape with a first at least one cutout, and the second shape comprises a second circular shape with a second at least one cutout.

13. The method according to claim 1, further comprising: for each additional test axis of at least one additional test axis:

receiving, from the motion cueing system, additional positioning information corresponding to an additional movement to an additional excursion value along the additional test axis applied to the test stand;

receiving, from the HMD or one or more external sensors, additional HMD spatial position data associated with the HMD secured to the test stand;

generating additional virtual adjustment information by at least combining the HMD spatial position data with the positioning information, wherein the virtual viewpoint and the second shape are adjusted based on the virtual adjustment information;

recording additional reference data associated with the additional movement applied to the test stand;

generating an additional positional displacement vector by at least comparing the additional reference data of the second shape with additional reference data of the first shape;

determining an additional HMD movement tracking error based on the positional displacement vector; and determining an additional test result according to the additional HMD movement tracking error, wherein the additional test result is associated with the additional test axis.

14. The method according to claim 1, wherein the reference data of the first shape comprises a plurality of first reference data portions, each first reference data portion indicating at least a reference position of the first shape at a plurality of positions along the test axis, wherein the reference data of the second shape comprises a plurality of reference data portions, each second reference data portion indicating at least the reference position of the second shape at the plurality of positions along the test axis, wherein the positional displacement vector is one of a plurality of positional displacement vectors, each positional displacement vector determined at a position of the plurality of positions along the test axis according to the first reference data at the position of the plurality of positions and the second reference data at the position of the plurality of positions, and wherein the HMD movement tracking error is one of a plurality of HMD movement tracking errors, each HMD movement tracking error determined at the position of the plurality of positions along the test axis according to the positional displacement vector at the position of the plurality of positions.

15. An apparatus comprising:

at least one processor; and at least one non-transitory computer readable memory connected to the at least one processor and including computer program code, wherein the at least one non-transitory computer readable memory and the computer program code are configured, with the at least one processor, to cause the apparatus to:

display a virtual viewpoint of a virtual environment, the virtual viewpoint comprising at least a first shape and a second shape, wherein the second shape adjusts in the virtual viewpoint as the virtual viewpoint adjusts, the first shape is affixed in the virtual viewpoint of the virtual environment, and the virtual viewpoint of the virtual environment adjusts in response to movement of a head mounted display (HMD) secured to a test stand;

receive, from a motion cueing system, positioning information corresponding to a movement to an excursion value along a test axis applied to the test stand;

receive, from the HMD or one or more external sensors, HMD spatial position data associated with the HMD secured to the test stand;

generate virtual adjustment information by at least combining the HMD spatial position data with the positioning information, wherein the virtual viewpoint and the second shape are adjusted according to the virtual adjustment information;

record reference data associated with the movement applied to the test stand;

generate a positional displacement vector by at least comparing the reference data of the second shape with reference data of the first shape;

determine a HMD movement tracking error according to the positional displacement vector; and determine a test result according to the HMD movement tracking error.

16. The apparatus according to claim 15, wherein to determine the test result according to the HMD movement tracking error, the at least one non-transitory computer readable memory and the computer program code are configured, with the at least one processor, to further cause the apparatus to:

determine that the HMD movement tracking error is within a threshold, wherein the test result is a test passed result.

17. The apparatus according to claim 15, wherein the at least one non-transitory computer readable memory and the computer program code are configured, with the at least one processor, to further cause the apparatus to:

detect a test completion trigger, wherein the test result is determined in response to the detecting of the test completion trigger.

18. At least one non-transitory computer-readable storage medium having computer program instructions stored thereon that, when executed by at least one processor, causes the at least one processor to perform:

displaying a virtual viewpoint of a virtual environment, wherein the virtual viewpoint includes at least a first shape and a second shape, wherein the second shape adjusts in the virtual viewpoint as the virtual viewpoint adjusts, and the first shape is affixed in the virtual viewpoint of the virtual environment, the virtual viewpoint of the virtual environment adjusts in response to movement of a head mounted display (HMD) secured to a test stand;

receiving, from a motion cueing system, positioning information corresponding to a movement to an excursion value along a test axis applied to the test stand;

receiving, from the HMD or one or more external sensors, HMD spatial position data associated with the HMD secured to the test stand;

generating virtual adjustment information by at least combining the HMD spatial position data with the positioning information, wherein the virtual viewpoint and the second shape are adjusted according to the virtual adjustment information;

recording reference data associated with the movement applied to the test stand;

generating a positional displacement vector by at least comparing the reference data of the second shape with reference data of the first shape;

determining a HMD movement tracking error according to the positional displacement vector; and determining a test result according to the HMD movement tracking error.

19. The at least one non-transitory computer-readable storage medium according to claim 18, wherein the computer program instructions stored, when executed by at least one processor, further causes the at least one processor to perform:

determining that the HMD movement tracking error is within a threshold, wherein the test result is a test passed result.

20. The at least one non-transitory computer-readable storage medium according to claim 18, further comprising:

detecting a test completion trigger, wherein determining the test result is in response to the detecting of the test completion trigger.

* * * * *